(12) United States Patent
Shimotsuma

(10) Patent No.: US 11,397,430 B2
(45) Date of Patent: Jul. 26, 2022

(54) INFORMATION PROCESSING METHOD, INFORMATION PROCESSING APPARATUS, AND INFORMATION PROCESSING SYSTEM

(71) Applicant: Panasonic Intellectual Property Corporation of America, Torrance, CA (US)

(72) Inventor: Yuta Shimotsuma, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 226 days.

(21) Appl. No.: 16/527,635

(22) Filed: Jul. 31, 2019

(65) Prior Publication Data
US 2020/0050185 A1 Feb. 13, 2020

(30) Foreign Application Priority Data

Aug. 9, 2018 (JP) .............................. JP2018-149818
Apr. 26, 2019 (JP) .............................. JP2019-084991

(51) Int. Cl.
*G05D 1/00* (2006.01)
*B60W 10/04* (2006.01)
(Continued)

(52) U.S. Cl.
CPC .......... *G05D 1/0022* (2013.01); *B60W 10/04* (2013.01); *B60W 10/18* (2013.01); *B60W 10/20* (2013.01);
(Continued)

(58) Field of Classification Search
CPC ... G05D 1/0022; G05D 1/0038; B60W 10/04; B60W 10/18; B60W 10/20; B60W 30/09;
(Continued)

(56) References Cited

U.S. PATENT DOCUMENTS

| | | | |
|---|---|---|---|
| 5,714,928 A * | 2/1998 | Sudo | .......................... B60T 7/22 340/436 |
| 2014/0098664 A1* | 4/2014 | Mizuguchi | ............ H04W 4/021 370/230 |

(Continued)

FOREIGN PATENT DOCUMENTS

| | | |
|---|---|---|
| JP | 2011-43884 | 3/2011 |
| JP | 5366703 | 12/2013 |

(Continued)

OTHER PUBLICATIONS

Yasunao Yoshizaki, Remote control System, Jan. 17, 2017 (Year: 2017).*
Extended European Search Report dated Nov. 29, 2019 in corresponding European Patent Application No. 19189946.7.

*Primary Examiner* — Nicholas Kiswanto
*Assistant Examiner* — Jamal A Shah
(74) *Attorney, Agent, or Firm* — Wenderoth, Lind & Ponack, L.L.P.

(57) ABSTRACT

Provided is an information processing method of an information processing apparatus for remotely operating a vehicle via a communication network. The information processing method includes: obtaining vehicle information about the vehicle; obtaining a delay time of the communication network; calculating, based on the vehicle information and the delay time, a stop position at which the vehicle would stop if the vehicle were caused to perform an emergency stop; and outputting stop position information indicating the calculated stop position.

12 Claims, 20 Drawing Sheets

(51) Int. Cl.
*B60W 10/20* (2006.01)
*B60W 30/09* (2012.01)
*B60W 30/095* (2012.01)
*G08G 1/16* (2006.01)
*B60W 10/18* (2012.01)

(52) U.S. Cl.
CPC .......... *B60W 30/09* (2013.01); *B60W 30/095* (2013.01); *G05D 1/0038* (2013.01); *G08G 1/163* (2013.01); *B60W 2520/10* (2013.01); *B60W 2554/00* (2020.02); *B60W 2720/106* (2013.01)

(58) Field of Classification Search
CPC ........... B60W 30/095; B60W 2554/00; B60W 2520/10; B60W 2720/106; G08G 1/163
See application file for complete search history.

(56) References Cited

U.S. PATENT DOCUMENTS

| | | | | |
|---|---|---|---|---|
| 2015/0120087 A1* | 4/2015 | Duan | .................. | H04W 4/40 |
| | | | | 701/1 |
| 2017/0210380 A1 | 7/2017 | Hegemann | | |
| 2017/0336788 A1 | 11/2017 | Iagnemma | | |
| 2018/0201367 A1* | 7/2018 | Georgin | ................. | B64C 25/46 |
| 2020/0341461 A1* | 10/2020 | Yokoyama | ........... | G05D 1/0016 |

FOREIGN PATENT DOCUMENTS

| | | |
|---|---|---|
| JP | 2018-116385 | 7/2018 |
| JP | 2018116385 A * | 7/2018 |

\* cited by examiner

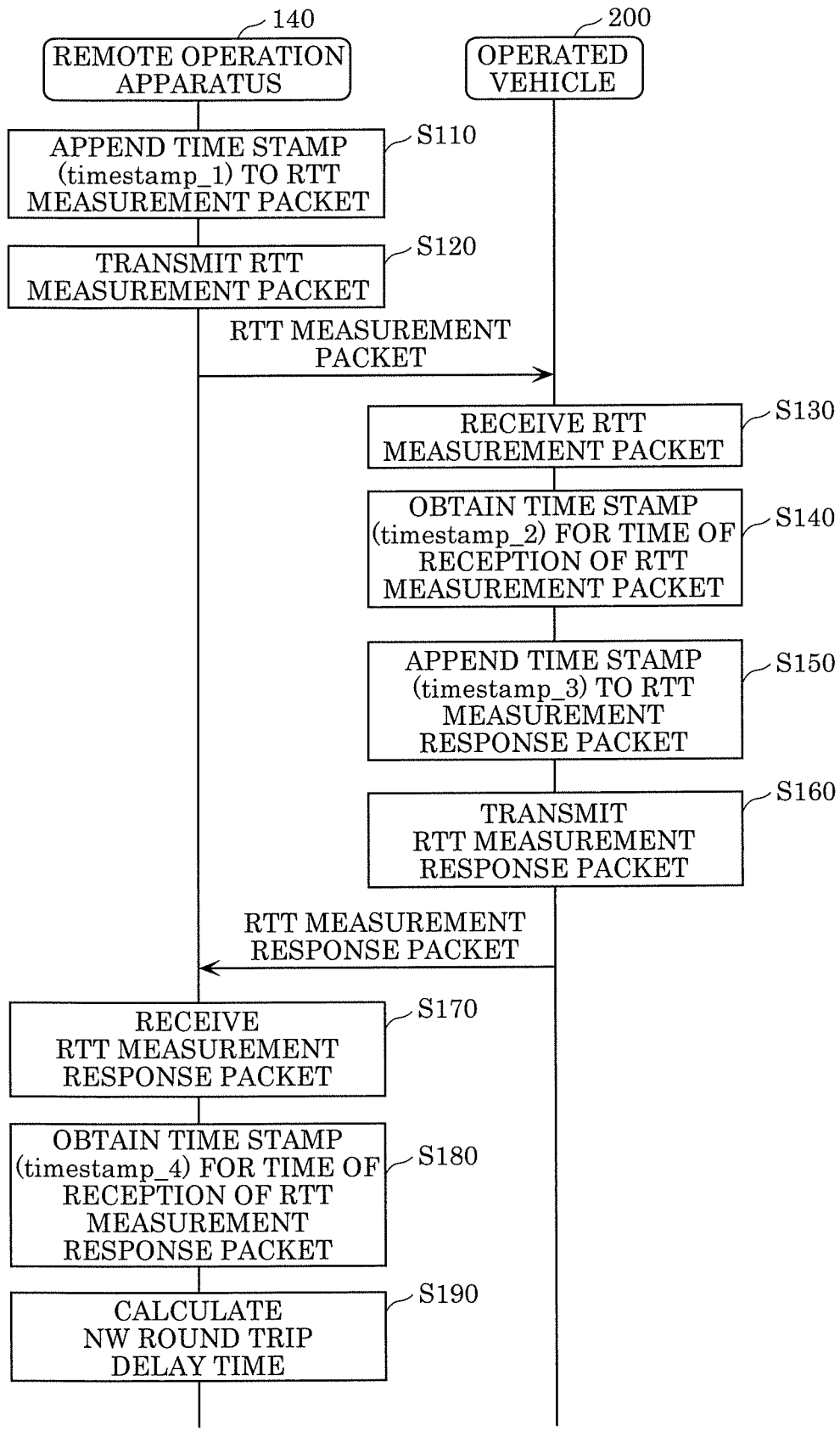

INFORMATION PROCESSING METHOD, INFORMATION PROCESSING APPARATUS, AND INFORMATION PROCESSING SYSTEM

CROSS REFERENCE TO RELATED APPLICATION

This application claims the benefit of priority of Japanese Patent Application Number 2018-149818 filed on Aug. 9, 2018, and Japanese Patent Application Number 2019-84991 filed on Apr. 26, 2019, the entire contents of which are hereby incorporated by reference.

BACKGROUND

1. Technical Field

The present disclosure relates to an information processing method of an information processing apparatus for remotely operating a vehicle, the information processing apparatus, and an information processing system.

2. Description of the Related Art

A vehicle control system is known that uses wireless communication via, for example, a wireless local area network (LAN) or a mobile phone line, to enable an operator in a remote location to indirectly drive and maneuver a vehicle in which a driver is not riding or a vehicle in which a driver is not operating.

In such a vehicle control system, sensing results obtained by sensors (for example, a millimeter wave radar sensor, a laser radar sensor, and a camera) provided in the vehicle observing the area around the vehicle, is conveyed from the vehicle to the operator, and control information related to the driving of the vehicle is conveyed from the operator to the vehicle, allowing the operator to maneuver the vehicle from a remote location.

Japanese Patent No. 5366703 discloses a remote operation system (vehicle control system) for a semi-autonomous unmanned vehicle (operated vehicle). The remote operation system disclosed in Japanese Patent No. 5366703 includes a semi-autonomous vehicle that obtains range data for within a driving area of the vehicle, performs autonomous driving based on the range data, and is remotely maneuvered by an operator in a remote location, to operate in accordance with maneuver information (control information) transmitted from a remote maneuver apparatus. With this remote operation system it is possible to remotely operate a semi-autonomous vehicle.

SUMMARY

There are instances in which the operator causes the vehicle to perform an emergency stop. In such cases, the operator needs to cause the vehicle to perform an emergency stop safely. With the technique disclosed in Japanese Patent No. 5366703, an image captured by an imaging device included in the vehicle is displayed on a display, and the operator remotely operates the vehicle by checking the image displayed on the display, but with this method, there are instances in which the vehicle cannot perform an emergency stop safely.

In view of the above, the present disclosure has an object to provide an information processing method, information processing apparatus, and information processing system capable of causing a vehicle to safely perform an emergency stop.

An information processing method according to one aspect of the present disclosure is a method of an information processing apparatus for remotely operating a vehicle via a communication network, and includes: obtaining vehicle information about the vehicle; obtaining a delay time of the communication network; calculating, based on the vehicle information and the delay time, a stop position at which the vehicle would stop if the vehicle were caused to perform an emergency stop; and outputting stop position information indicating the stop position calculated.

An information processing apparatus according to one aspect of the present disclosure is for remotely operating a vehicle via a communication network, and includes: a vehicle information obtainer that obtains vehicle information about the vehicle; a delay time obtainer that obtains a delay time of the communication network; a controller that calculates, based on the vehicle information and the delay time, a stop position at which the vehicle would stop if the vehicle were caused to perform an emergency stop; and an outputter that outputs stop position information indicating the stop position calculated.

An information processing system according to one aspect of the present disclosure includes: the information processing apparatus described above; and a display apparatus that displays an image based on the stop position information outputted by the information processing apparatus.

The information processing method, information processing apparatus, and information processing system according to one aspect of the present disclosure are capable of causing a vehicle to safely perform an emergency stop.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5A is a sequence chart illustrating one example of operations for obtaining NW delay time according to Embodiment 1;

DETAILED DESCRIPTION OF THE EMBODIMENTS

Figure 1:
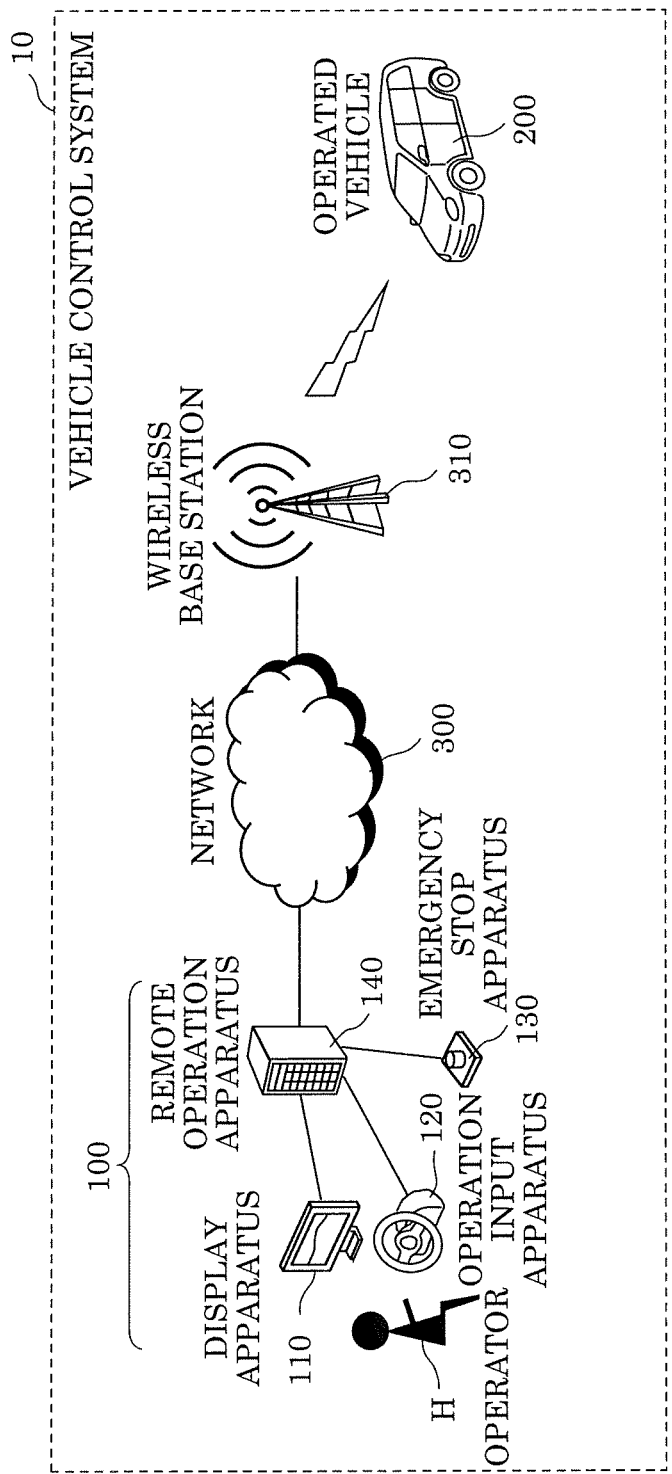
FIG. 1 illustrates an outline of a configuration of a vehicle control system according to Embodiment 1.

Underlying Knowledge Forming Basis of the Present Disclosure

As described above, with the technique disclosed in Japanese Patent No. 5366703, an image captured by an imaging device included in the vehicle is displayed on a display, and the operator remotely operates the vehicle by checking the image displayed on the display. In other words, Japanese Patent No. 5366703 merely discloses the displaying of an image captured by an imaging device on a display. In such cases, the operator does not know where the vehicle will stop even if the operator instructs the vehicle to stop in an emergency. Stated differently, when the operator performs an emergency stop, the operator cannot know explicitly at which point the vehicle will stop. Accordingly, with the method disclosed in Japanese Patent No. 5366703, there are instances in which the vehicle cannot perform an emergency stop safely.

In view of this, an information processing method according to one aspect of the present disclosure is a method of an information processing apparatus for remotely operating a vehicle via a communication network, and includes: obtaining vehicle information about the vehicle; obtaining a delay time of the communication network; calculating, based on the vehicle information and the delay time, a stop position at which the vehicle would stop if the vehicle were caused to perform an emergency stop; and outputting stop position information indicating the stop position calculated.

With this, the operator can explicitly know the position at which the vehicle would stop if the vehicle were caused to perform an emergency stop, by checking the image displaying stop position information (i.e., image displaying the stop position) outputted from the information processing apparatus. In other words, in the event of causing the vehicle to perform an emergency stop, the operator can take into account the stop position when performing an operation for causing the vehicle to perform an emergency stop. Accordingly, with the information processing method according to one aspect of the present disclosure, it is possible to cause the vehicle to safely perform an emergency stop.

Moreover, for example, the vehicle is set with a plurality of deceleration patterns for the emergency stop of the vehicle, and the stop position is calculated for each of the plurality of deceleration patterns.

With this, by checking the image displaying the plurality of stop positions calculated for each of the plurality of deceleration patterns, the operator can select, from among the plurality of displayed stop positions, the deceleration pattern that can most safely cause the vehicle to perform an emergency stop. Accordingly, with the information processing method according to one aspect of the present disclosure, it is possible to cause the vehicle to more safely perform an emergency stop.

Moreover, for example, the information processing method further includes calculating, based on a packet loss rate in the communication network, a number of times N to repeatedly transmit control information indicating to perform the emergency stop, where N≥2. The stop position is calculated further using the number of times N.

With this, by calculating the stop position using the number of times N, which is based on packet loss rate, it is possible to calculate the stop position taking into account packet loss, even when packet loss occurs during communication between the vehicle and the information processing apparatus. Accordingly, with the information processing method according to one aspect of the present disclosure, it is possible to cause the vehicle to safely perform an emergency stop even when packet loss occurs.

Moreover, for example, the stop position includes a first stop position at which the vehicle would stop if the vehicle were to perform the emergency stop based on the control information transmitted the N-th time.

With this, the operator can know the first stop position, which is the farthest position from among the vehicle stop positions calculated taking into account packet loss rate. In other words, the operator can determine whether the vehicle can safely perform an emergency stop or not by checking the first stop position. Accordingly, with the information processing method according to one aspect of the present disclosure, it is possible to cause the vehicle to safely perform an emergency stop even when packet loss occurs.

Moreover, for example, the stop position further includes a second stop position at which the vehicle would stop if the vehicle were to perform the emergency stop based on the control information transmitted a first time, and the stop position information includes a first stop range based on the first stop position and the second stop position.

With this, the operator can know the stop range of potential stop positions of the vehicle due to packet loss. In other words, the operator can determine whether the vehicle can safely perform an emergency stop or not by checking the first stop range. Accordingly, with the information processing method according to one aspect of the present disclosure, it is possible to cause the vehicle to more safely perform an emergency stop even when packet loss occurs.

Moreover, for example, the information processing method further includes obtaining obstacle information including a position of an obstacle in a surrounding area of the vehicle; and determining, based on the stop position and the position of the obstacle, whether there is a risk of collision between the vehicle and the obstacle. In the outputting, alert information is further outputted when it is determined that there is a risk of collision between the vehicle and the obstacle in the determining, the alert information being for informing that there is a risk of collision between the vehicle and the obstacle.

This makes it possible to, when there is a risk of collision between the vehicle and the obstacle, inform the operator of the risk of collision via alert information before the vehicle collides with the obstacle. Thus, the operator can cause the vehicle to stop (for example, perform an emergency stop) before the vehicle collides with the obstacle. Moreover, even in cases in which the vehicle and the obstacle will collide, since emergency stop operations can be performed ahead of time before the collision, the severity of the collision can be mitigated. For example, when there is an obstacle in the direction of travel of the vehicle and the vehicle does not perform a driving maneuver (for example, a stop maneuver) for avoiding collision with the obstacle, the operator can remotely operate the vehicle based on the alert information.

Moreover, for example, the stop position includes a third stop position and a fourth stop position that are calculated based on the vehicle information, the fourth stop position being farther than the third stop position, and the stop position information includes a second stop range based on the third stop position and the fourth stop position.

This makes it possible for the operator to operate the vehicle based on the second stop range. In other words, since the operator can operate the vehicle taking into consideration potential stop positions of the vehicle, the operator can more appropriately operate the vehicle.

Moreover, for example, the third stop position is calculated based on a first speed that is slower than a speed of the vehicle included in the vehicle information, and the fourth stop position is calculated based on a second speed that is faster than the speed of the vehicle.

This makes it possible to calculate the second stop range based on a speed in the vehicle information that greatly influences the stop position. Accordingly, it is possible to more accurately calculate the second stop position.

Moreover, for example, the vehicle information includes information indicating a current position and a speed of the vehicle.

This makes it possible to calculate a stop position using information obtained by, for example, a sensor provided in the vehicle.

Moreover, for example, the vehicle information further includes at least one of an acceleration, a steering angle, an angular speed, and an angular acceleration of the vehicle.

Accordingly, it is possible to more accurately calculate the stop position.

Moreover, for example, a remote operation apparatus according to one aspect of the present disclosure is an information processing apparatus for remotely operating a vehicle via a communication network, and includes: a vehicle information obtainer that obtains vehicle information about the vehicle; a delay time obtainer that obtains a delay time of the communication network; a controller that calculates, based on the vehicle information and the delay time, a stop position at which the vehicle would stop if the vehicle were caused to perform an emergency stop; and an outputter that outputs stop position information indicating the stop position calculated.

This achieves the same advantageous effects as the information processing method described above. That is, as a result of the information processing apparatus outputting stop position information indicating the stop position, the operator can check the image displaying the outputted stop position information (i.e., image displaying the stop position). With this, the operator can explicitly know the position at which the vehicle would stop if the vehicle were caused to perform an emergency stop. In other words, in the event of causing the vehicle to perform an emergency stop, the operator can take into account the stop position when performing an operation for causing the vehicle to perform an emergency stop. Accordingly, with the information processing apparatus according to one aspect of the present disclosure, it is possible to cause the vehicle to safely perform an emergency stop.

Moreover, for example, a remote operation system according to one example of the present disclosure includes: the information processing apparatus described above; and a display apparatus that displays an image based on the stop position information outputted by the information processing apparatus.

With this, the operator can check the image that is displayed on the display apparatus and displays stop position information (i.e., an image displaying the stop position) outputted from the information processing apparatus. With this, the operator can explicitly know the position at which the vehicle would stop if the vehicle were caused to perform an emergency stop. In other words, in the event of causing the vehicle to perform an emergency stop, the operator can take into account the stop position when performing an operation for causing the vehicle to perform an emergency stop. Accordingly, with the information processing system according to one aspect of the present disclosure, it is possible to cause the vehicle to safely perform an emergency stop.

General or specific aspects of the present disclosure may be realized as a system, method, integrated circuit, computer program, non-transitory computer-readable recording medium such as a CD-ROM, or any given combination thereof. The computer program may be stored on the recording medium in advance, and may be supplied to the recording medium over a wide-area communications network, including the internet.

Hereinafter, embodiments will be specifically described with reference to the drawings.

Each of the embodiments described below shows a general or specific example. The numerical values, shapes, materials, elements, the arrangement and connection of the elements, steps, the processing order of the steps etc. in the following embodiments are mere examples, and thus do not limit the scope of the present disclosure. Moreover, among the elements in the following embodiments, those not recited in any one of the independent claims, indicating the broadest concept, are described as optional elements.

Note that the drawings are schematic diagrams and are not necessarily precise illustrations. Moreover, elements that are essentially the same share like reference signs in the drawings, and repeated description is omitted or simplified.

Moreover, in the present specification, terminology indicating the shape of an element, such as "rectangle", values, and value ranges do not only refer to their exact meanings, but include a range of shapes, values, and value ranges that are essentially the same. For example, they include a margin of error of approximately a few percent.

Embodiment 1

Hereinafter, an information processing method, etc., for a remote operation apparatus according to the present disclosure will be described with reference to FIG. 1 through FIG. 6.

1-1. Vehicle Control System Configuration

First, a configuration of a vehicle control system including a remote operation apparatus will be described with reference to FIG. 1 through FIG. 3. FIG. 1 illustrates an outline of the configuration of the vehicle control system according to the present embodiment.

As illustrated in FIG. 1, vehicle control system 10 is a system that communicably connects, via wireless base station 310 and network 300 for, for example, a wireless LAN and a communication terminal, operated vehicle 200 and remote operation system 100 (specifically, remote operation apparatus 140). Wireless base station 310 and network 300 are one example of a communication network. Moreover, operated vehicle 200 is one example of a vehicle that operator H remotely operates. Note that in the present specification, a vehicle is, for example, a self-driving car that does not require driver operation to control driving, but may be a vehicle capable of switching between automated driving and manual driving. Moreover, the terminology "vehicle" includes, in addition to typically known vehicles such as automobiles, trains, busses, etc., boats such as ferries and aircraft such as airplanes.

Remote operation system 100 will be described in more detail with reference to FIG. 2. FIG. 2 illustrates a functional configuration of remote operation system 100 according to the present embodiment.

Figure 2:
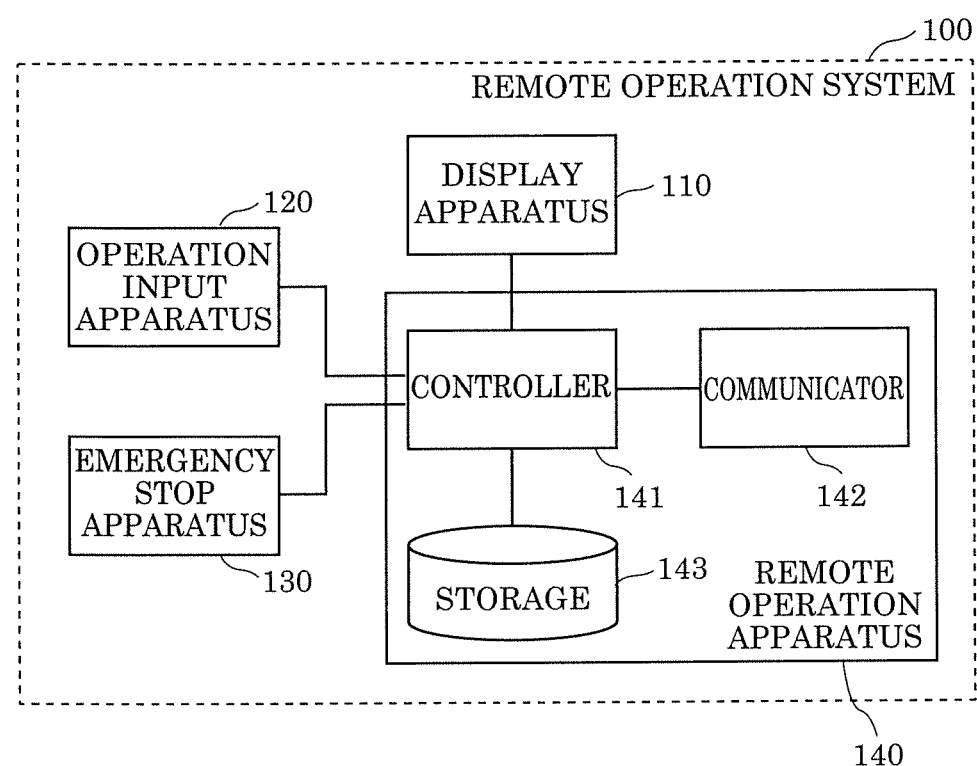
FIG. 2 illustrates a functional configuration of a remote operation system according to Embodiment 1.

As illustrated in FIG. 1 and FIG. 2, remote operation system 100 includes display apparatus 110, operation input apparatus 120, emergency stop apparatus 130, and remote operation apparatus 140.

Display apparatus 110 is a monitor that is connected to remote operation apparatus 140 and displays an image related to operated vehicle 200. Display apparatus 110 is capable of informing operator H of the stop position of operated vehicle 200 by displaying the stop position that operated vehicle 200 would stop at if caused to perform an emergency stop. Moreover, display apparatus 110 may be capable of informing operator H of the state of operated vehicle 200 and the obstacles by displaying the state of operated vehicle 200 and obstacles in the surrounding area of operated vehicle 200 to operator H.

A plurality of display apparatuses 110 may be connected to remote operation apparatus 140. For example, a display apparatus 110 for the purpose of displaying the stop position that operated vehicle 200 would stop at if caused to perform an emergency stop and a display apparatus 110 that displays the state of operated vehicle 200 and the obstacles may be connected to remote operation apparatus 140. Note that the terminology "image" includes moving and still pictures. Moreover, the terminology "obstacle" means a vehicle other than operated vehicle 200 or a person, and mainly refers to a moving object that hinders the travel of operated vehicle 200. Note that an obstacle may be real estate that is fixed to the ground.

Operation input apparatus 120 is an apparatus that is connected to remote operation apparatus 140, and receives an input of a remote operation from operator H. Operation input apparatus 120 is an apparatus for operating operated vehicle 200, such as a steering wheel and/or foot pedal (for example, accelerator pedal, brake pedal, etc.). Operation input apparatus 120 outputs inputted vehicle operation information to remote operation apparatus 140.

Emergency stop apparatus 130 is an apparatus that is connected to remote operation apparatus 140, and receives an input of a remote operation from operator H. Emergency stop apparatus 130 is an apparatus for stopping operated vehicle 200 in an emergency, such as an emergency stop button. Emergency stop apparatus 130 outputs inputted emergency stop information to remote operation apparatus 140.

Remote operation apparatus 140 is an apparatus for operator H in a remote location to remotely operate operated vehicle 200 via a communication network. In the present embodiment, remote operation apparatus 140 further causes the stop position that operated vehicle 200 would stop at if operator H were to cause operated vehicle 200 to perform an emergency stop to be displayed. As illustrated in FIG. 2, remote operation apparatus 140 includes controller 141, communicator 142, and storage 143.

Controller 141 is a control apparatus that controls the various elements included in remote operation apparatus 140. In the present embodiment, based on, for example, vehicle information about operated vehicle 200 received via communicator 142, and the delay time of the communication network, controller 141 calculates the stop position that operated vehicle 200 would stop at if operated vehicle 200 were to perform an emergency stop. Controller 141 causes display apparatus 110 to display the stop position by outputting information for the display of the stop position to display apparatus 110.

Vehicle information is information that is held by operated vehicle 200 itself that is related to the driving of operated vehicle 200. The vehicle information includes the speed and the current position of operated vehicle 200. The vehicle information may further include at least one of the acceleration, the steering angle, the angular speed, and the angular acceleration of operated vehicle 200. This makes it possible for controller 141 to more precisely calculate the stop position of operated vehicle 200.

Delay time is the time it takes information to transmit between remote operation apparatus 140 and operated vehicle 200. The longer the delay time is, i.e., the greater the delay in the communication network is, the longer the time it takes for operated vehicle 200 to start an operation corresponding to an operation instruction from the time of transmission of the operation instruction to operated vehicle 200. For example, when the operation instruction is an instruction to perform an emergency stop, the longer the time it takes for operated vehicle 200 to begin stopping from the time of transmission of the instruction to perform an emergency stop. This increases the distance from the transmission of the emergency stop instruction to operated vehicle 200 until operated vehicle 200 comes to a stop, which increases the risk of an accident. In view of this, operator H needs to know where operated vehicle 200 will stop when operator H causes operated vehicle 200 to perform an emergency stop. For this reason, as described above, controller 141 calculates the stop position by using the delay time of the communication network.

Moreover, based on image information of the surrounding area of operated vehicle 200 received via communicator 142, controller 141 generates an image required for operator H to operate operated vehicle 200, and outputs, to display apparatus 110, the generated image. Note that here, when obstacle position information including the current position of an obstacle is received from operated vehicle 200, the image may be generated further using the received obstacle position information. For example, the color of an obstacle near operated vehicle 200 in the image may be changed, an obstacle near operated vehicle 200 in the image may be displayed as flashing.

Controller 141 may superimpose the stop position on the image received from operated vehicle 200 via communicator 142, and display the resulting composite image on display apparatus 110. Moreover, controller 141 may display an aerial view of the stop position on display apparatus 110. Controller 141 may obtain, from, for example, the current position of operated vehicle 200 included in vehicle information, map information for the surrounding area of operated vehicle 200, and superimpose the stop position on the obtained map information to generate the aerial view.

Controller 141 may further include a real-time clock function for calculating the current year, month, date, and time. Alternatively, controller 141 may use the time indicated based on a GPS signal, which is a signal from a GPS satellite, received via communicator 142, as a GPS time, which is an accurate time. Controller 141 receives GPS signals at predetermined time intervals.

Communicator 142 is a wireless communication module for wirelessly communicating with operated vehicle 200 over a communication network. Communicator 142 receives, via the communication network, vehicle information about operated vehicle 200, and information for calculating the delay time of the communication network (specifically, an RTT measurement reply packet). Moreover, under control by controller 141, communicator 142 transmits control information for the driving of operated vehicle 200, to operated vehicle 200 via a communication network. Control information includes vehicle control information based on vehicle operation information, and emergency stop control information based on emergency stop information.

Storage 143 is a storage apparatus that stores a control program that is executed by controller 141. Moreover, storage 143 may store, for example, the vehicle information obtained via communicator 142, and the delay time. Storage 143 may be implemented as, for example, semiconductor memory.

The above-described remote operation apparatus 140 is one example of an information processing apparatus for remotely operating operated vehicle 200 via a communication network. Moreover, remote operation system 100 is one example of an information processing system.

Although not illustrated in the drawings, note that remote operation system 100 may include, for example, a sound output device (for example, a speaker) that is connected to remote operation apparatus 140 and informs operator H of immediate danger by outputting an alarm sound to operator H to warn operator H about an obstacle. This makes it possible for operator H to recognize a situation in which operated vehicle 200 needs to perform an emergency stop.

When there is a possibility that operated vehicle 200 cannot drive safely, remote operation apparatus 140 may display, on display apparatus 110, a stop position that operated vehicle 200 would stop at if caused to perform an emergency stop. For example, when there is an obstacle within a predetermined distance from operated vehicle 200, remote operation apparatus 140 may display, on display apparatus 110, a stop position that operated vehicle 200 would stop at if caused to perform an emergency stop. Alternatively, for example, when information calling attention to an obstacle is displayed or output, remote operation apparatus 140 may display, on display apparatus 110, a stop position that operated vehicle 200 would stop at if caused to perform an emergency stop. Alternatively, for example, when a predetermined operation is made on emergency stop apparatus 130, remote operation apparatus 140 may display, on display apparatus 110, a stop position that operated vehicle 200 would stop at if caused to perform an emergency stop. A predetermined operation is, for example, when emergency stop apparatus 130 is implemented as an emergency stop button, the emergency stop button being pressed down a predetermined amount by operator H. Moreover, when remote operation apparatus 140 includes a sound pickup apparatus, when the sound pickup apparatus obtains sound indicating to display the stop position, remote operation apparatus 140 may display, on display apparatus 110, a stop position that operated vehicle 200 would stop at if caused to perform an emergency stop.

Next, operated vehicle 200 will be described in detail with reference to FIG. 3. FIG. 3 illustrates a functional configuration of operated vehicle 200 according to the present embodiment.

Figure 3:
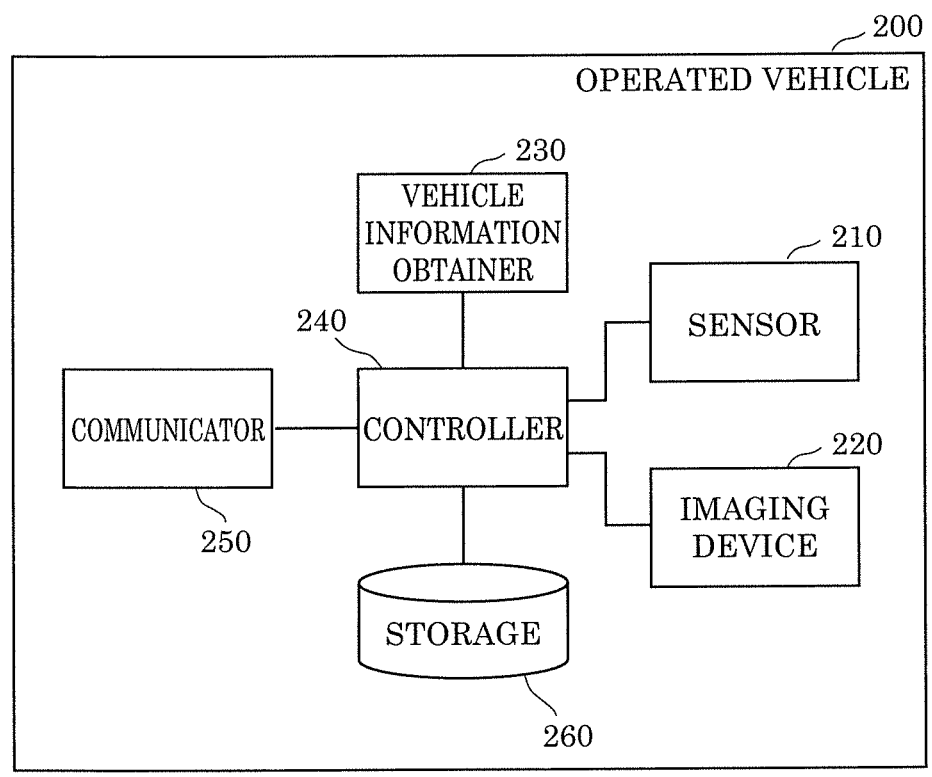
FIG. 3 illustrates a functional configuration of an operated vehicle according to Embodiment 1.

As illustrated in FIG. 3, operated vehicle 200 includes sensor 210, imaging device 220, vehicle information obtainer 230, controller 240, communicator 250, and storage 260. Operated vehicle 200 is a vehicle that is capable of autonomous driving based on, for example, driving data held in advance by the vehicle, and driving data generated based on information detected by, for example, sensor 210, and is capable of automated driving by remote operation by operator H in a remote location, under a predetermined condition.

Sensor 210 is an apparatus that detects the status of the surrounding area of operated vehicle 200. For example, sensor 210 detects at least one of the position, speed, and size of an obstacle (for example, another vehicle, person, etc.) present in the surrounding area of operated vehicle 200. Sensor 210 is realized as a light detection and ranging (LIDAR) sensor, a radar (for example, millimeter wave radar) sensor, or a combination of both.

Imaging device 220 is a camera that captures an image of the surrounding area of operated vehicle 200. For example, imaging device 220 is provided in a position from which it is possible to capture the front, right side, left side, and rear of operated vehicle 200. In other words, imaging device 220 is provided on operated vehicle 200 so as to be able to capture the surrounding area of operated vehicle 200. Imaging device 220 may be configured of, for example, a plurality of cameras. Moreover, imaging device 220 may be a camera provided in a driving recorder.

Sensor 210 and imaging device 220 may be provided in plurality in or on operated vehicle 200. In other words, operated vehicle 200 may include one or more sensors 210 and one or more imaging devices 220.

Vehicle information obtainer 230 obtains, via a vehicular network such as a control area network (CAN), information related to the driving of operated vehicle 200 from various sensors in operated vehicle 200. The various sensors include a speed sensor that detects the speed of operated vehicle 200 and a global positioning system (GPS) sensor that detects the current position of operated vehicle 200. In other words, vehicle information obtainer 230 obtains the speed of operated vehicle 200 from a speed sensor, and obtains the current position of operated vehicle 200 from a GPS sensor. Note that the various sensors may include a steering angle sensor that detects the steering angle of operated vehicle 200, a brake sensor that detects the degree of braking, an accelerator sensor that detects the degree of acceleration (hereinafter also referred to as accelerator position), and a turn signal sensor that detects the turn signal direction.

Controller 240 is a control apparatus that controls the various elements included in operated vehicle 200. In the present embodiment, controller 240 transmits, to remote operation system 100 via communicator 250, vehicle information including the speed and current position of operated vehicle 200 obtained via vehicle information obtainer 230, and sensor information from operated vehicle 200 obtained from at least one of sensor 210 and imaging device 220 (for example, the image information captured by imaging device 220). Moreover, controller 240 outputs, to a drive controller (not illustrated in the drawings) that controls the driving of the host vehicle, control information obtained from remote operation system 100 via communicator 250. The drive controller includes a speed control unit (for example, an engine control unit (ECU)) that controls the speed of operated vehicle 200 by operating the accelerator, brake, and gear shift, and a steering control unit that controls the direction of travel of operated vehicle 200 by operating the steering of operated vehicle 200.

Controller 240 may detect an obstacle in the surrounding area of operated vehicle 200 based on the sensor information obtained from sensor 210 and imaging device 220, and generate obstacle position information indicating the current position of the obstacle. Note that the obstacle position information may include information related to at least one of the current position of the obstacle, the speed of the obstacle, the acceleration of the obstacle, the direction of travel of the obstacle, the size of the obstacle, and type of obstacle. The type of obstacle differentiates between, for example, a pedestrian, motorcycle, and automobile. The current position of the obstacle indicates the position of the obstacle at the point in time that the obstacle is sensed by the sensors.

Controller 240 generates image information of the surrounding area of operated vehicle 200 based on sensor information obtained from imaging device 220. The image information of the surrounding area of operated vehicle 200 may be generated as separate image information for each of the front, rear, right, and left directions relative to operated vehicle 200, and may be generated as composite image information for all of the front, rear, right, and left directions relative to operated vehicle 200 as a collection.

Controller 240 may include a real-time clock function for calculating the current year, month, date, and time. Alternatively, controller 240 may use the time indicated based on a GPS signal, which is a signal from a GPS satellite, received via communicator 250, as a GPS time, which is an accurate time. Controller 240 receives GPS signals at predetermined time intervals.

Communicator 250 is a wireless communication module for wirelessly communicating with remote operation apparatus 140 via wireless base station 310 and network 300. Under control by controller 240, communicator 250 transmits vehicle information, image information, and obstacle position information to remote operation apparatus 140 via wireless base station 310 and network 300. Moreover, communicator 250 receives control information related to the driving of operated vehicle 200 via wireless base station 310 and network 300.

Storage 260 is a storage apparatus that stores a control program that is executed by controller 240. Moreover, storage 260 may store, for example, the control information obtained via communicator 250, and the sensor information obtained from sensor 210 and imaging device 220. Storage 260 may be implemented as, for example, semiconductor memory.

1-2. Remote Operation System Operations

Figure 4:
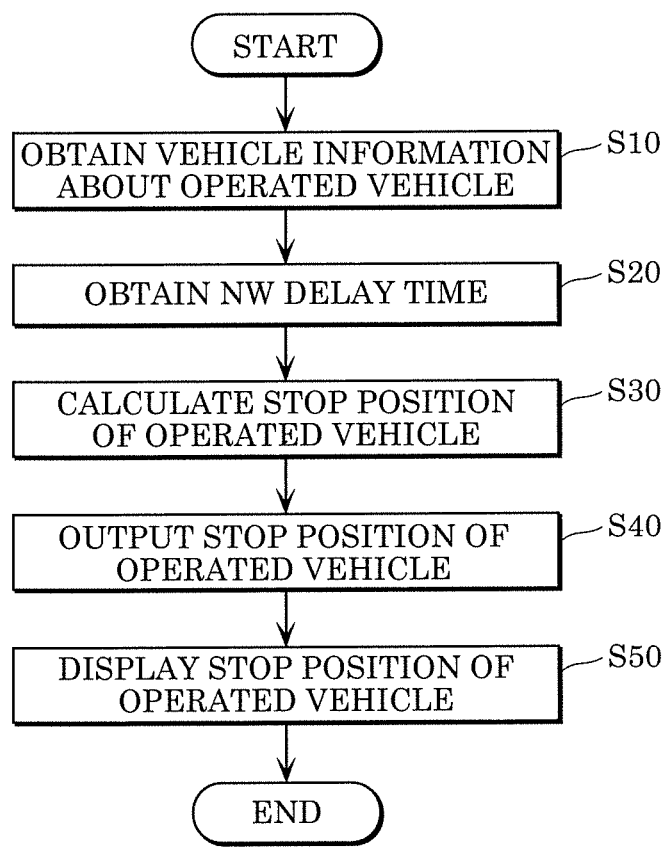
FIG. 4 is a flow chart illustrating operations performed by the remote operation system according to Embodiment 1.

Next, operations performed by remote operation system 100 will be described with reference to FIG. 4 through FIG. 6. FIG. 4 is a flow chart illustrating operations performed by remote operation system 100 according to the present embodiment. The operations in steps S10 through S40 illustrated in FIG. 4 are operations executed in remote operation apparatus 140.

As illustrated in FIG. 4, remote operation apparatus 140 obtains vehicle information about operated vehicle 200 (S10). Specifically, controller 141 receives vehicle information about operated vehicle 200 via communicator 142. Communicator 142 functions as a vehicle information obtainer that obtains vehicle information about operated vehicle 200. Remote operation apparatus 140 obtains the delay time of the communication network (NW) (S20).

Figure 5B:
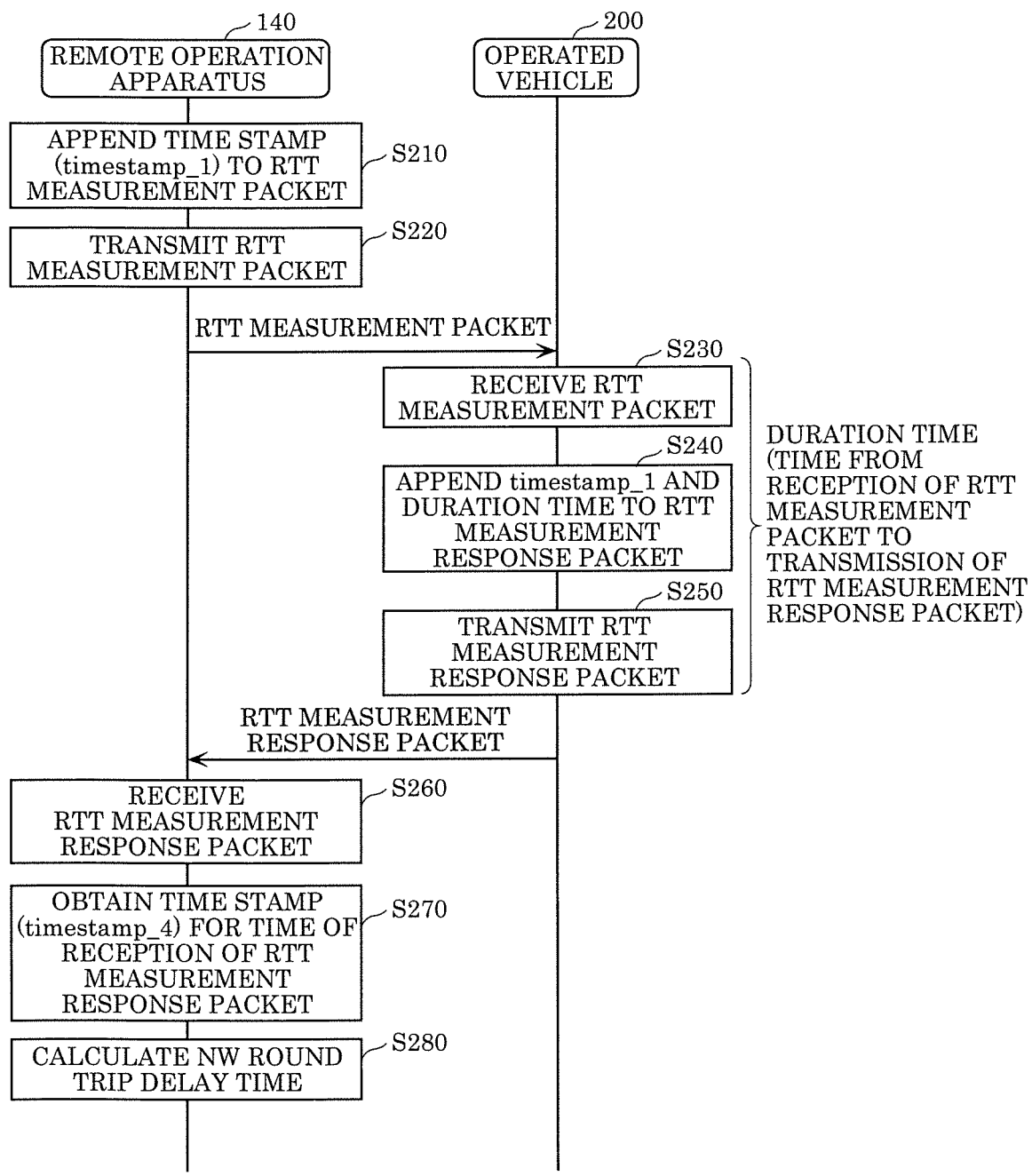
FIG. 5B is a sequence chart illustrating another example of operations for obtaining NW delay time according to Embodiment 1.

Next, the obtaining of the delay time of the communication network will be described with reference to FIG. 5A and FIG. 5B. FIG. 5A and FIG. 5B illustrate, as an example of delay time, a case in which round trip delay time is calculated. FIG. 5A is a sequence chart illustrating an example of operations for obtaining the delay time of the communication network (NW) according to the present embodiment. FIG. 5A describes an example in which the delay time is obtained when remote operation apparatus 140 and operated vehicle 200 are time synchronized. Time synchronized means, for example, that GPS time is used for times in remote operation apparatus 140 and operated vehicle 200, or that remote operation apparatus 140 and operated vehicle 200 include atomic clocks. Hereinafter, a case in which remote operation apparatus 140 and operated vehicle 200 include a GPS sensor (not illustrated in the drawings) will be described. Note that GPS time means time information included in radio waves received by the GPS sensor from a satellite.

As illustrated in FIG. 5A, first, remote operation apparatus 140 appends a time stamp (timestamp_1) to a round trip time (RTT; delay time) measurement packet (S110). Controller 141 obtains the time of transmission of the RTT measurement packet as timestamp_1 from the GPS sensor, and writes the time into the RTT measurement packet. Controller 141 then transmits the RTT measurement packet to operated vehicle 200 via communicator 142 (S120).

Operated vehicle 200 receives the RTT measurement packet (S130). Controller 240 obtains a timestamp of the reception time of the RTT measurement packet (timestamp_2) from the GPS sensor (S140). Controller 240 then appends the time stamps (timestamp_1 through timestamp_3) to RTT measurement reply packet, which is the reply corresponding to the RTT measurement packet (S150). Controller 240 obtains the time of transmission of the RTT measurement reply packet as timestamp_3 from the GPS sensor, and writes the time into the RTT measurement reply packet. Controller 240 then transmits the RTT measurement reply packet to remote operation apparatus 140 via communicator 250 (S160).

Controller 141 in remote operation apparatus 140 receives the RTT measurement reply packet via communicator 142 (S170). Controller 141 obtains a timestamp of the reception time of the RTT measurement reply packet (timestamp_4) (S180). Controller 141 obtains timestamp_4 from the GPS sensor. Controller 141 then calculates the NW round trip delay time by using the time stamps (timestamp_1 through timestamp_4) (S190). Controller 141 calculates the NW round trip delay time by, for example, subtracting the difference between timestamp_2 and timestamp_3 from the difference between timestamp_1 and timestamp_4. Controller 141 functions as a delay time obtainer that obtains the communication network delay time.

Next, the obtaining of the delay time when remote operation apparatus 140 and operated vehicle 200 are not time synchronized will be described with reference to FIG. 5B. FIG. 5B is a sequence chart illustrating another example of operations for obtaining the NW delay time according to the present embodiment.

Since steps S210 through S230 in FIG. 5B are the same as steps S110 through S130 in FIG. 5A, repeated description is omitted.

As illustrated in FIG. 5B, operated vehicle 200 appends timestamp_1 and duration time to the RTT measurement reply packet (S240). The duration time is the time from receipt of the RTT measurement packet to transmission of the RTT measurement reply packet, and is calculated by the real time clock function of controller 240. Controller 240 then transmits the RTT measurement reply packet to remote operation apparatus 140 via communicator 250 (S250).

Controller 141 in remote operation apparatus 140 receives the RTT measurement reply packet via communicator 142 (S260). Controller 141 obtains a timestamp of the reception time of the RTT measurement reply packet (timestamp_4) (S270). Controller 141 then calculates the NW round trip delay time by using the time stamps (timestamp_1 and timestamp_4) and the duration time (S280). Controller 141 calculates the NW round trip delay time by, for example, subtracting the duration time from the difference between timestamp_1 and timestamp_4.

Note that in the above description, the round trip delay time is exemplified as being calculated by subtracting the processing time in operated vehicle 200 (for example, the difference between timestamp_2 and timestamp_3 in FIG. 5A or the duration time in FIG. 5B), but this example is not limiting. The round trip delay time may be calculated from the difference between timestamp_1 and timestamp_4, for example.

Note that in the above description, the delay time is exemplified as a round trip delay time, but the delay time may be a one-way delay time (for example, the time from transmission of the RTT measurement packet by remote operation system 100 until reception by operated vehicle 200).

Note that rather than writing the transmission time directly into the packet, controller 141 may store the transmission time in storage 143 in association with the packet sequence number. In step S190 or S280, controller 141 may calculate the round trip delay time reading the transmission time from storage 143 and using the read-out transmission time and the reception time at which the RTT measurement reply packet is received.

The measurement of the delay time is repeatedly executed at predetermined time intervals. Controller 141 may, for example, store the calculated delay times in storage 143. In step S20, controller 141 may, at the point in time that the vehicle information is obtained, obtain the delay time by reading the most recent delay time from storage 143.

Referring back to FIG. 4, controller 141 calculates the stop position of operated vehicle 200 (S30). The stop position is calculated with the following Equation 1, where p is the current position of operated vehicle 200, v is the speed of operated vehicle 200, a is the deceleration of operated vehicle 200, t_nw is the communication network delay time, and t_sys is the system delay time.

[MATH. 1]

$$\text{stop position} = p + v \times (t\_nw + t\_sys) + \int_0^{v/a} (v - a \times t) dt \quad \text{(Equation 1)}$$

The second item indicates the distance of travel of operated vehicle 200 from the time of operation of emergency stop apparatus 130 by operator H to the time operated vehicle 200 actually starts emergency stop operations (hereinafter also referred to as stop operations) (i.e., brake reaction distance). The third item indicates the distance of travel of operated vehicle 200 from the time that operated vehicle 200 performs the stop operations to the time that operated vehicle 200 actually comes to a stop (i.e., braking distance). Deceleration a is the deceleration when operated vehicle 200 is caused to perform an emergency stop, and is for example in the range of 0.1 G to 0.3 G (where G indicates acceleration due to gravity; G-forces). For example, as the stop operations, operated vehicle 200 decelerates at a constant deceleration a.

Note that system delay time includes at least one of the delay time in remote operation system 100 and the delay time in operated vehicle 200. The delay time in remote operation system 100 is the time from operation of emergency stop apparatus 130 by operator H until transmission of the emergency stop control information by communicator 142. The delay time in operated vehicle 200 is the time from receipt of the emergency stop control information until start of the stop operations. The system delay time may be a predetermined constant.

Controller 141 then outputs the stop position of operated vehicle 200 to display apparatus 110 (S40). Specifically, controller 141 outputs stop position information indicating the stop position of operated vehicle 200. For example, controller 141 outputs, to display apparatus 110, image information including the stop position of operated vehicle 200 or image information for displaying an aerial view including the stop position of operated vehicle 200. Controller 141 functions as an outputter that outputs stop position information via a communication module for communicating with display apparatus 110.

Upon obtaining the stop position of operated vehicle 200 from remote operation apparatus 140, display apparatus 110 displays an image including the stop position (S50). One example of the stop position displayed by display apparatus 110 will be given with reference to FIG. 6. FIG. 6 illustrates an example of a display of the stop position of operated vehicle 200 according to the present embodiment. Roads 401 and 402 in image M1 illustrated in FIG. 6 indicate roads that operated vehicle 200 drives on. FIG. 6 also shows current position 200p of operated vehicle 200 (corresponding to current position 200p indicated in Equation 1), and stop position 200q of operated vehicle 200. The arrow in FIG. 6 indicates the direction of travel of operated vehicle 200.

Figure 6:
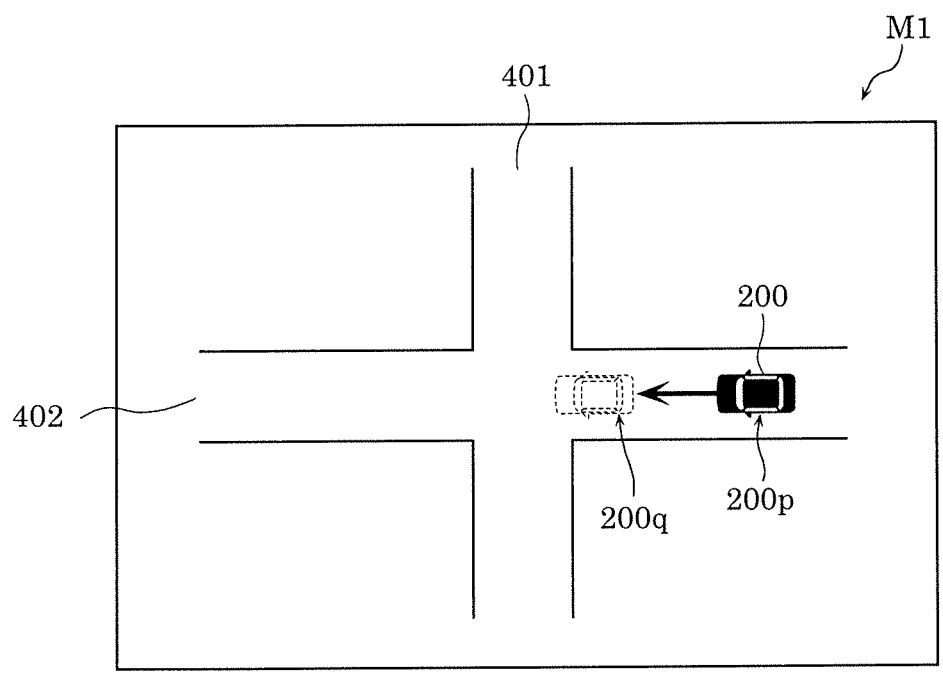
FIG. 6 illustrates an example of a display of a stop position of the operated vehicle according to Embodiment 1.

As illustrated in FIG. 6, when operated vehicle 200 performs an emergency stop at current position 200p, a portion of operated vehicle 200 enters the intersection of roads 401 and 402, as indicated by stop position 200q. By checking image M1, operator H can easily recognize that making an emergency stop at current position 200p would risk a collision with another vehicle driving on road 401. Accordingly, operator H can properly determine, based on stop position 200q displayed on display apparatus 110, when to cause operated vehicle 200 to perform an emergency stop. Operator H can safely cause operated vehicle 200 to perform an emergency stop by operating emergency stop apparatus 130 when stop position 200q displayed on display apparatus 110 is in a position at which, for example, collision with an obstacle would not happen.

Note that in FIG. 6, current position 200p and stop position 200q of operated vehicle 200 are displayed in the form of a vehicle, but the form that current position 200p and stop position 200q are displayed in is not particularly limited. Moreover, among current position 200p and stop position 200q of operated vehicle 200, it is sufficient if at least stop position 200q is displayed in image M1.

As described above, the information processing method of remote operation apparatus 140 according to present embodiment is an information processing method for remotely operating operated vehicle 200 via network 300 and wireless base station 310. The information processing method includes obtaining vehicle information about operated vehicle 200 (S10), obtaining the delay time of network 300 and wireless base station 310 (S20), calculating, based on the vehicle information and the delay time, a stop position of operated vehicle 200 that operated vehicle 200 would stop at if operated vehicle 200 were caused to perform an emergency stop (S30), and outputting stop position information indicating the calculated stop position (S40).

With this, operator H can explicitly know the position at which operated vehicle 200 would stop if operated vehicle 200 were caused to perform an emergency stop, by checking an image (for example, image M1) in which stop position information output from remote operation apparatus 140 is displayed. In other words, in the event of causing operated vehicle 200 to perform an emergency stop, operator H can take into account the stop position when performing an operation for causing operated vehicle 200 to perform an emergency stop. Accordingly, with the information processing method according to the present embodiment, it is possible to cause operated vehicle 200 to safely perform an emergency stop. With the information processing method according to the present embodiment, for example, it is possible to reduce the risk of an accident resulting from operated vehicle 200 being caused to perform an emergency stop and coming to a stop at a position that is, for example, in an intersection.

Embodiment 2

Hereinafter, an information processing method, etc., for remote operation apparatus 140 according to the present embodiment will be described with reference to FIG. 7 through FIG. 9. Note that the description in the present embodiment will focus on the differences from Embodiment 1. Remote operation system 100a according to the present embodiment includes, instead of emergency stop apparatus 130 in remote operation system 100 according to Embodiment 1, first emergency stop apparatus 130a, second emergency stop apparatus 130b, and third emergency stop apparatus 130c. Hereinafter, remote operation system 100a will be described in detail.

2-1. Remote Operation System Configuration

First, a configuration of a remote operation system 100a including remote operation apparatus 140 will be described with reference to FIG. 7. FIG. 7 illustrates a functional configuration of remote operation system 100a according to the present embodiment.

Figure 7:
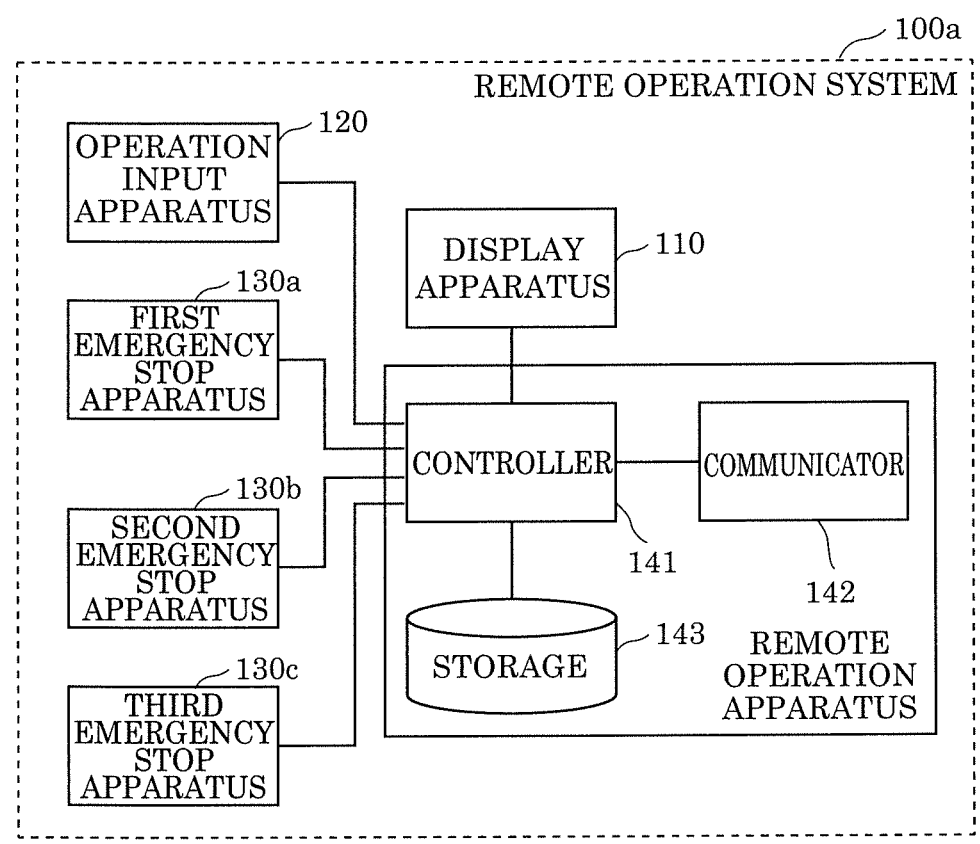
FIG. 7 illustrates a functional configuration of a remote operation system according to Embodiment 2.

As illustrated in FIG. 7, remote operation system 100a includes first emergency stop apparatus 130a, second emergency stop apparatus 130b, and third emergency stop apparatus 130c. The deceleration upon an emergency stop of operated vehicle 200 is different in first emergency stop apparatus 130a, second emergency stop apparatus 130b, and third emergency stop apparatus 130c. In other words, in remote operation system 100a, there are a plurality of set deceleration patterns for when operated vehicle 200 performs an emergency stop. The deceleration is set in advance in first emergency stop apparatus 130a through third emergency stop apparatus 130c. In the present embodiment, among the decelerations corresponding to first emergency stop apparatus 130a through third emergency stop apparatus 130c, the deceleration corresponding to first emergency stop apparatus 130a (hereinafter also referred to as the first deceleration) is the fastest, while the deceleration corresponding to third emergency stop apparatus 130c (hereinafter also referred to as the third deceleration) is the slowest. The deceleration corresponding to second emergency stop apparatus 130b is also referred to as the second deceleration. Note that the number of emergency stop apparatuses included in remote operation system 100a is not limited to three; remote operation system 100a may include two or more emergency stop apparatuses.

2-2. Remote Operation System Operations

Next, operations performed by remote operation system 100a will be described with reference to FIG. 8 and FIG. 9. FIG. 8 is a flow chart illustrating operations performed by remote operation system 100a according to the present embodiment. Note that since steps S310 and S320 in FIG. 8 are the same as steps S10 and S20 in FIG. 4 described in Embodiment 1, repeated description thereof is omitted.

Figure 8:
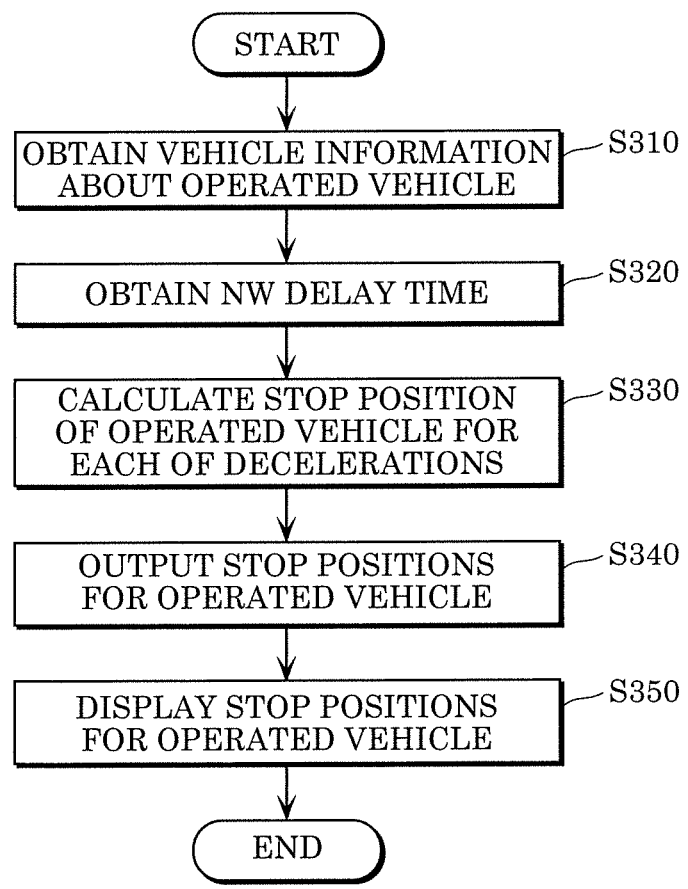
FIG. 8 is a flow chart illustrating operations performed by the remote operation system according to Embodiment 2.

As illustrated in FIG. 8, remote operation apparatus 140 calculates the stop position of operated vehicle 200 for each of a plurality of decelerations (S330). In the present embodiment, controller 141 calculates the stop position for each of the first deceleration through the third deceleration corresponding to first emergency stop apparatus 130a through third emergency stop apparatus 130c, respectively. Specifically, controller 141 calculates the three stop positions by changing the value of deceleration a in Equation 1.

Controller 141 then outputs the stop positions of operated vehicle 200 to display apparatus 110 (S340). Specifically, controller 141 outputs a plurality of items of stop position information indicating the stop positions of operated vehicle 200. For example, controller 141 outputs, to display apparatus 110, image information including the stop positions of operated vehicle 200 or image information for displaying an aerial view including the stop positions of operated vehicle 200.

Upon obtaining the stop positions of operated vehicle 200 from remote operation apparatus 140, display apparatus 110 displays an image including the stop positions (S350). One example of the stop positions displayed by display apparatus 110 will be given with reference to FIG. 9. FIG. 9 illustrates an example of a display of the stop positions of operated vehicle 200 according to the present embodiment. FIG. 9 illustrates image M2 showing, on the same screen, stop position 200a when first emergency stop apparatus 130a is operated, stop position 200b when second emergency stop apparatus 130b is operated, and stop position 200c when third emergency stop apparatus 130c is operated. Note that "on the same screen" as used herein means that stop positions 200a through 200c are shown concurrently on the screen displayed by display apparatus 110.

Figure 9:
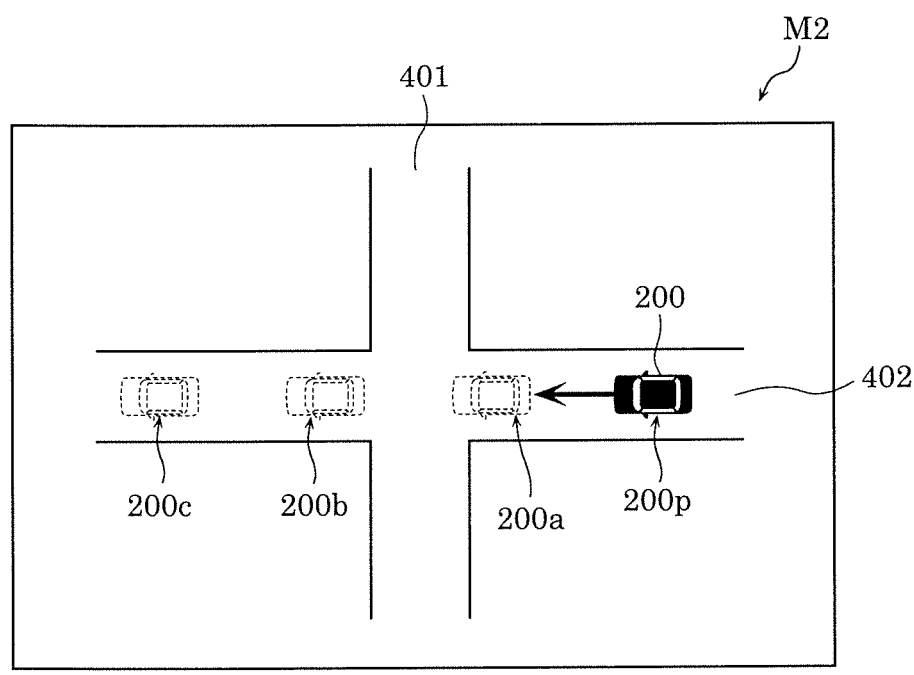
FIG. 9 illustrates an example of a display of stop positions of an operated vehicle according to Embodiment 2.

As illustrated in FIG. 9, if operated vehicle 200 performs an emergency stop at current position 200p, operated vehicle 200 will stop at one of stop position 200a through stop position 200c, depending on the deceleration. Operator H can know which deceleration can cause operated vehicle 200 to come to an emergency stop in a safe location by checking image M2. In other words, operator H can determine which of first emergency stop apparatus 130a through third emergency stop apparatus 130c can be operated to cause operated vehicle 200 to perform the safest emergency stop by checking image M2.

As indicated by stop position 200a, if operated vehicle 200 is caused to perform an emergency stop by operating first emergency stop apparatus 130a (stated differently, caused to perform an emergency stop using the first deceleration), a portion of operated vehicle 200 will be in the intersection when operated vehicle 200 comes to a stop. As indicated by stop position 200b, if operated vehicle 200 is caused to perform an emergency stop by operating second emergency stop apparatus 130b (stated differently, caused to perform an emergency stop using the second deceleration), operated vehicle 200 will come to a stop immediately after passing through the intersection. In other words, if operated vehicle 200 is caused to perform an emergency stop by operating either of first emergency stop apparatus 130a or second emergency stop apparatus 130b, there is a high risk of a collision with, for example, another vehicle. As indicated by stop position 200c, if operated vehicle 200 is caused to perform an emergency stop by operating third emergency stop apparatus 130c (stated differently, caused to perform an emergency stop using the third deceleration), operated vehicle 200 will come to a stop away from the intersection. In other words, if operated vehicle 200 is caused to perform an emergency stop by operating third emergency stop apparatus 130c, there is a low risk of a collision with, for example, another vehicle, compared to when first emergency stop apparatus 130a or second emergency stop apparatus 130b is operated. Accordingly, operator H can cause operated vehicle 200 to perform a safe emergency stop by operating third emergency stop apparatus 130c.

Note that in the above description, an example is given in which operated vehicle 200 decelerates at a certain deceleration (for example, the first deceleration through deceleration), but this example is not limiting. For example, at least one of the first deceleration through the third deceleration may be set such that the deceleration value changes with the elapse of time from the start of deceleration. In other words, the deceleration value of at least one of the first deceleration through the third deceleration may change over time. For example, the deceleration value may be set such that deceleration gradually increases from the start of deceleration. For example, the deceleration value of each of the first deceleration through the third deceleration may vary to different extents over time. In other words, in remote operation system 100a, there may be a plurality of set deceleration patterns used when operated vehicle 200 performs an emergency stop which vary in regard to the extent of change in deceleration over time from the initiation of the stop operations.

As described above, operated vehicle 200 is set with a plurality of deceleration patterns for when operated vehicle 200 performs an emergency stop (for example, the first deceleration through the third deceleration), and the stop position of operated vehicle 200 is calculated for each of the deceleration patterns (for example, stop positions 200a through 200c).

With this, when the plurality of stop positions calculated for each of the plurality of deceleration patterns are displayed on display apparatus 110, operator H can select, from among the plurality of stop positions displayed on display apparatus 110, the deceleration pattern that can most safely cause operated vehicle 200 to perform an emergency stop. Accordingly, with remote operation apparatus 140 according to the present embodiment, it is possible to cause operated vehicle 200 to even more safely perform an emergency stop.

Note that in the above description, operator H is exemplified as selecting a deceleration pattern from a plurality of emergency stop apparatuses (for example, first emergency stop apparatus 130a through third emergency stop apparatus 130c), but this example is not limiting. So long as the method used can allow operator H to select a deceleration pattern that causes operated vehicle 200 to perform an emergency stop via an operation made by operator H, the method of selecting the deceleration pattern may be a method other than the one described above. For example, operator H may select the deceleration pattern used when making an emergency stop by changing the extent to which he or she presses the brake pedal of operation input apparatus 120. For example, pressing the brake pedal more may increase the deceleration when making an emergency stop. Moreover, when remote operation system 100a includes a sound pickup apparatus (for example, a microphone) that collects the voice of operator H, operator H may specify the deceleration pattern by voice command.

Embodiment 3

Hereinafter, an information processing method, etc., for remote operation apparatus 140 according to the present embodiment will be described with reference to FIG. 10 through FIG. 13. Note that the description in the present embodiment will focus on the differences from Embodiment 1. Since the configuration of the remote operation system according to the present embodiment is the same as remote operation system 100 according to Embodiment 1, repeated description is omitted. The present embodiment is characterized in that remote operation apparatus 140 takes into consideration the packet loss rate of the communication network when calculating the stop position of operated vehicle 200. In other words, the stop position calculated by controller 141 may include a stop position for when there is packet loss (at least one of the first stop position and the second stop position to be described hereinafter). This will be described in detail hereinafter.

3-1. Remote Operation System Operations

Figure 10:
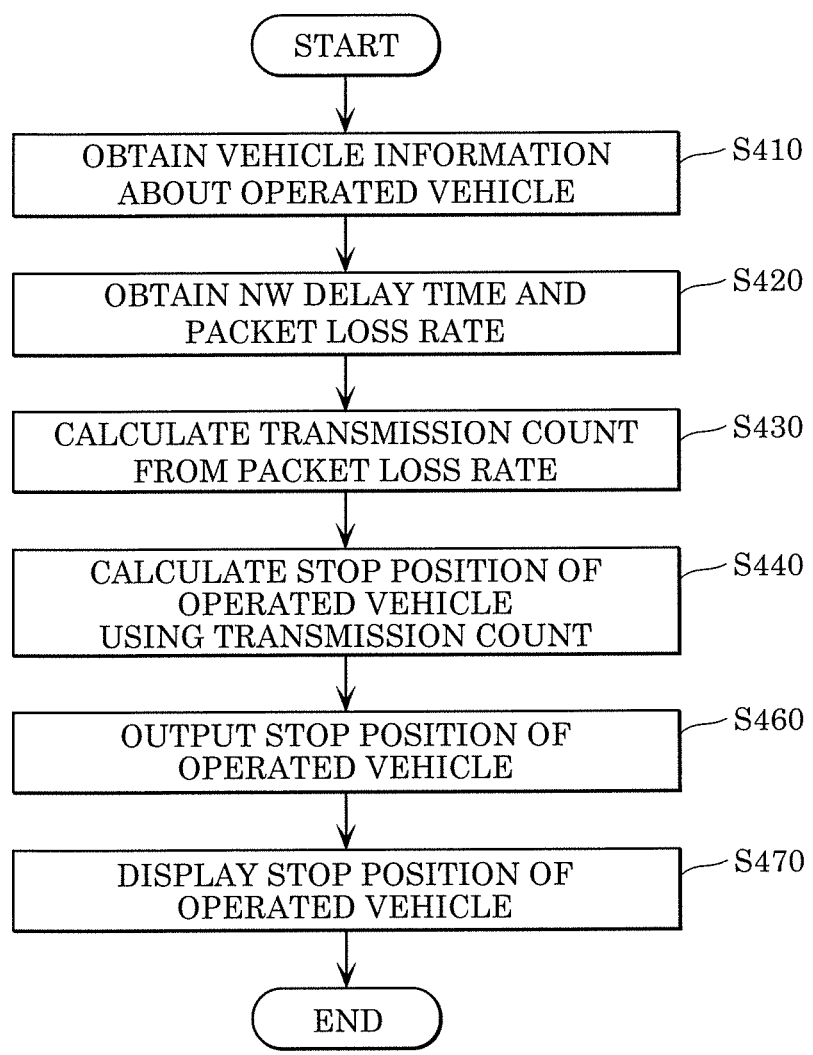
FIG. 10 is a flow chart illustrating operations performed by a remote operation system according to Embodiment 3.

Next, operations performed by the remote operation system will be described with reference to FIG. 10 through FIG. 13. FIG. 10 is a flow chart illustrating operations performed by the remote operation system according to the present embodiment. Note that since step S410 in FIG. 10 is the same as step S10 in FIG. 4 described in Embodiment 1, repeated description thereof is omitted.

As illustrated in FIG. 10, remote operation apparatus 140 obtains the delay time of the communication network (NW) and the packet loss rate (S420). Since NW delay time is the same as described in Embodiment, repeated description thereof is omitted. Packet loss rate is the proportion of packet loss that suddenly occurs due to, for example, noise.

Figure 11:
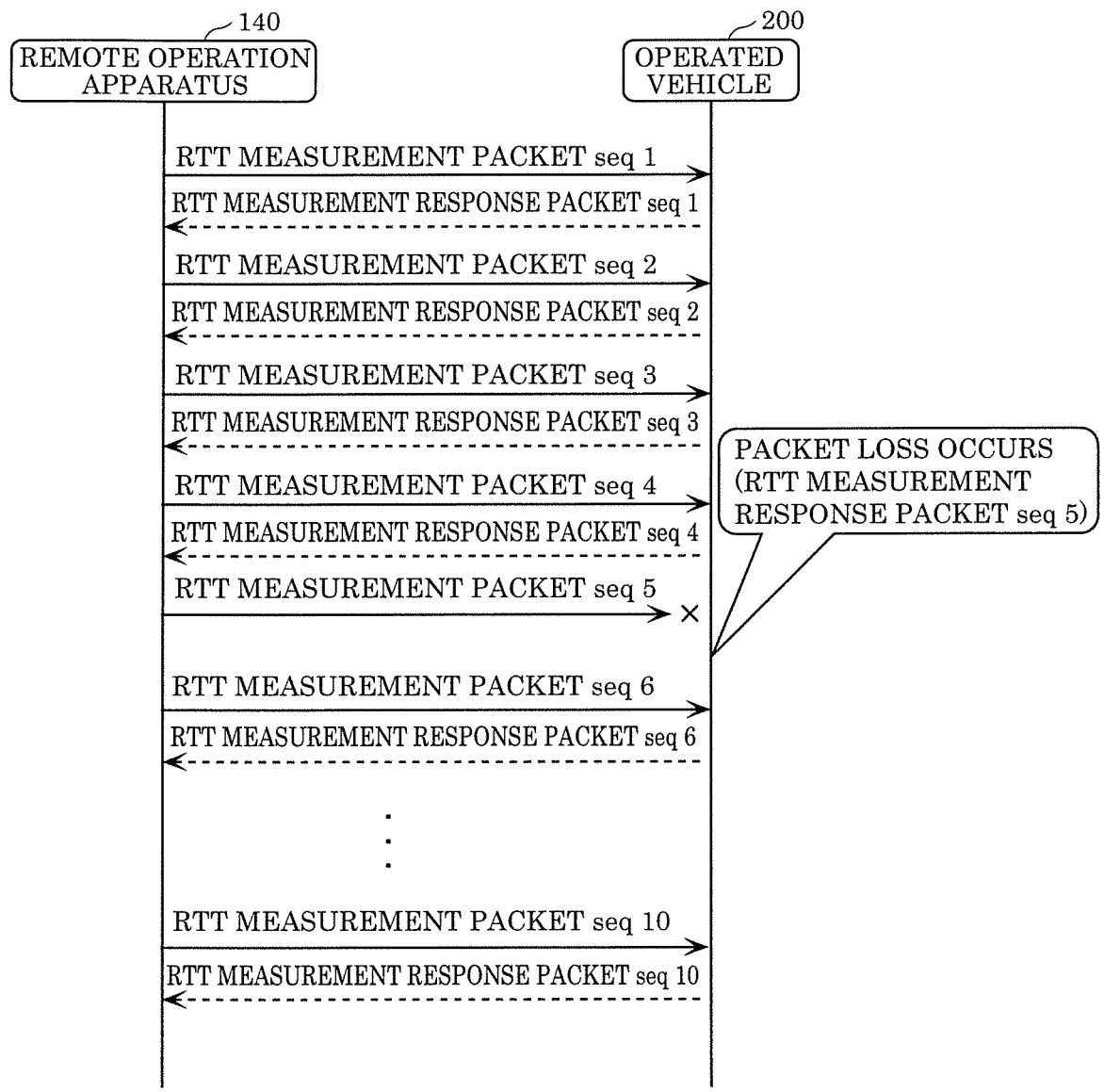
FIG. 11 is a sequence chart illustrating operations for calculating packet loss rate between a remote operation apparatus and an operated vehicle according to Embodiment 3.

Here, packet loss rate in the communication network will be described with reference to FIG. 11. FIG. 11 is a sequence chart illustrating operations for calculating packet loss rate between remote operation apparatus 140 and operated vehicle 200 according to the present embodiment. Remote operation apparatus 140 transmits an RTT measurement packet after each elapse a first period of time, in order to calculate packet loss rate between remote operation apparatus 140 and operated vehicle 200, that is to say, in the communication network. Each RTT measurement packet is appended with a different sequence number. FIG. 11 illustrates an example in which RTT measurement packets appended with sequence numbers from seq1 through seq10 are transmitted. When operated vehicle 200 receives an RTT measurement packet from remote operation apparatus 140, operated vehicle 200 transmits, to remote operation apparatus 140, an RTT measurement reply packet appended with the sequence number included in the RTT measurement packet. When, after remote operation apparatus 140 transmits an RTT measurement packet appended with a sequence number (for example, seq1) to operated vehicle 200, remote operation apparatus 140 does not receive an RTT measurement reply packet including the same sequence number (for example, seq1) within a second period of time, remote operation apparatus 140 determines that a packet loss has occurred. Note that, for example, the second period of time may be shorter than the first period of time. The first period of time is, for example, one second.

Controller 141 in remote operation apparatus 140 calculates packet loss rate from the reception status of the RTT measurement reply packet within a predetermined period of time. Specifically, controller 141 calculates packet loss rate based on the number of times the RTT measurement packet is transmitted in a predetermined period of time (hereinafter also referred to as "packet transmission count") and the number of times that a corresponding RTT measurement reply packet is not received within the second period of time in response to the transmission of an RTT measurement packet (hereinafter also referred to as "unreceived packet count"). More specifically, controller 141 calculates packet loss rate by dividing the unreceived packet count by the packet transmission count. For example, the packet loss rate is expressed as a percentage.

In the example illustrated in FIG. 11, since the packet transmission count is 10 and the unreceived packet count is one (specifically, in the instance of the RTT measurement reply packet of seq5), the packet loss rate is 10%. Note that controller 141 may calculate packet loss rate from the last packet transmission count and unreceived packet count at the point in time of the obtainment of the vehicle information about operated vehicle 200 in step S410. Controller 141 may calculate packet loss rate from a packet transmission count and unreceived packet count tallied during a third period of time counting back from the point in time of obtainment of vehicle information. Alternatively, controller 141 may calculate packet loss rate from an unreceived packet count tallied across a predetermined number of the most recent packet transmissions (for example, the most recent 10 packet transmissions) back from the point in time of obtainment of the vehicle information about operated vehicle 200 in step S410.

As described above, controller 141 obtains the packet loss rate in the communication network. Note that controller 141 may receive, via communicator 142, the packet loss rate in the communication network from another apparatus to obtain the packet loss rate. For example, controller 141 may receive the packet loss rate from operated vehicle 200.

Referring back to FIG. 10, controller 141 calculates, based on the packet loss rate obtained in step S420, the number of times N (N≥2) to repeatedly transmit emergency stop control information (one example of the control information) indicating to perform an emergency stop of operated vehicle 200, in order for the emergency stop control information to reach operated vehicle 200 (S430). Hereinafter, the number of times N is also referred to as "transmission count N". For example, controller 141 calculates transmission count N so that a product of the transmission count N and the packet loss rate is 100% or higher. In the example illustrated in FIG. 11, controller 141 sets the transmission count N to, for example, two times. Note that the transmission count N is not the number of times that remote operation apparatus 140 actually transmits the emergency stop control information to operated vehicle 200, but is an estimated number of times that will result in the emergency stop control information reaching operated vehicle 200 even if packet loss occurs.

Controller 141 then calculates the stop position of operated vehicle 200 using the transmission count N calculated in step S430 (S440). One characteristic of the present embodiment is the usage of, in the calculation of the stop position of operated vehicle 200, the transmission count N of the control information for remote operation apparatus 140 to perform an emergency stop. The stop position when operated vehicle 200 performs an emergency stop via the n-th (n≤N) instance of control information is calculated with the following Equation 2, where p is the current position of operated vehicle 200, v is the speed of operated vehicle 200, a is the deceleration of operated vehicle 200, t_nw is the communication network delay time, t_sys is the system delay time, and Δt is the time interval between repeated transmissions of the control information (see time interval Δt in FIG. 13).

[MATH. 2]

$$\text{stop position} = p + v \times (t\_nw + t\_sys + \Delta t \times (n-1)) + \int_0^{v/a} (v - a \times t) dt \quad \text{(Equation 2)}$$

The second item indicates the distance of travel of operated vehicle 200 from the time of operation of emergency stop apparatus 130 by operator H to the time operated vehicle 200 actually starts emergency stop operations (hereinafter also referred to as stop operations) (i.e., brake reaction distance). Equation 2 is the equivalent of Equation 1 plus the inclusion of time interval Δt between repeated transmissions of the control information. For example, when operated vehicle 200 starts stop operations at the first instance of control information, Δt×(n−1) equals zero, and a stop position equal to Equation 1 is calculated.

For example, controller 141 may calculate only the stop position for when operated vehicle 200 performs an emergency stop using the N-th (n=N) instance of control information. In other words, controller 141 may calculate only the stop position for when operated vehicle 200 performs an emergency stop at the position farthest from current position 200p. Moreover, for example, controller 141 may calculate the stop position for when operated vehicle 200 performs an emergency stop using the first (n=1) instance of control information and the stop position for when the operated vehicle 200 performs an emergency stop using the N-th (n=N) instance of control information. In other words, controller 141 may calculate the stop position for when operated vehicle 200 performs an emergency stop at the position closest to current position 200p and the stop position for when operated vehicle 200 performs an emergency stop at the position farthest from current position 200p indicated by Equation 2. With this, the range of potential stop positions of operated vehicle 200 when caused to perform an emergency stop can be known.

Controller 141 then outputs the stop position of operated vehicle 200 to display apparatus 110 (S450). Specifically, controller 141 outputs, to display apparatus 110, image information including the stop position of operated vehicle 200 or image information for displaying an aerial view including the stop position of operated vehicle 200.

Figure 12A:
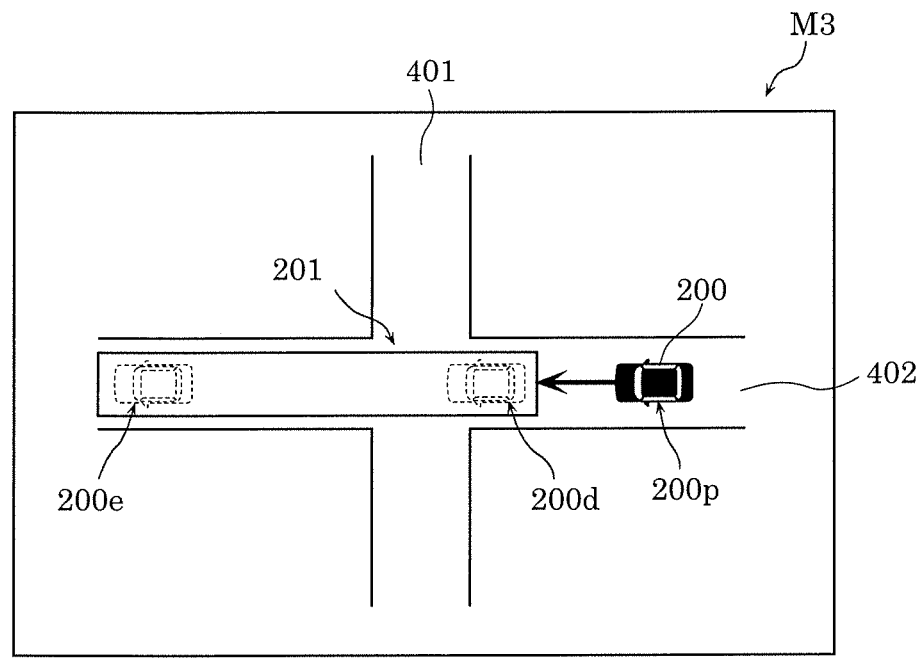
FIG. 12A illustrates an example of a display of stop positions of the operated vehicle according to Embodiment 3.
Figure 12B:
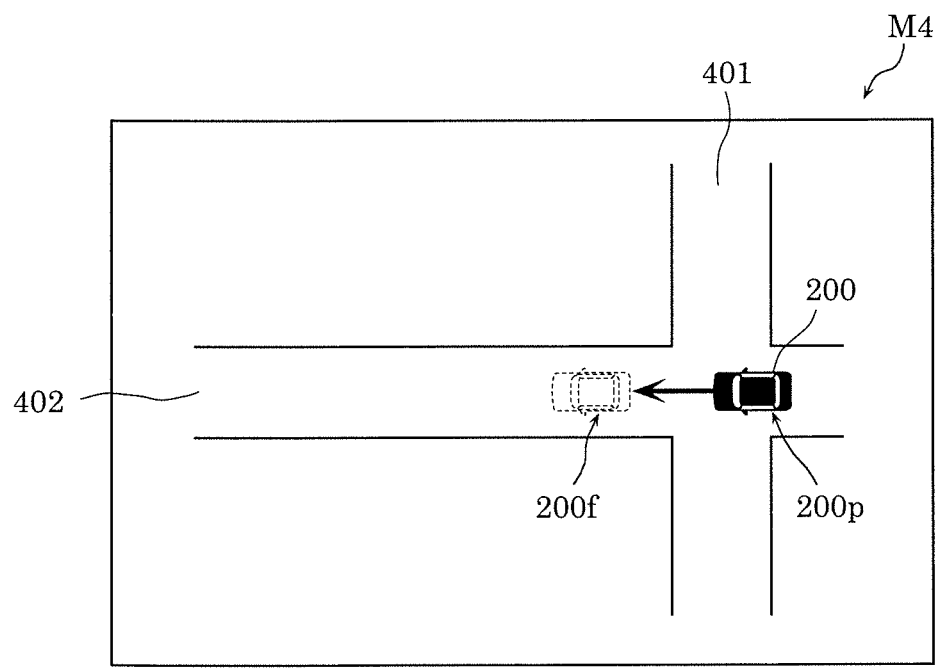
FIG. 12B illustrates another example of a display of a stop position of the operated vehicle according to Embodiment 3.
Figure 12C:
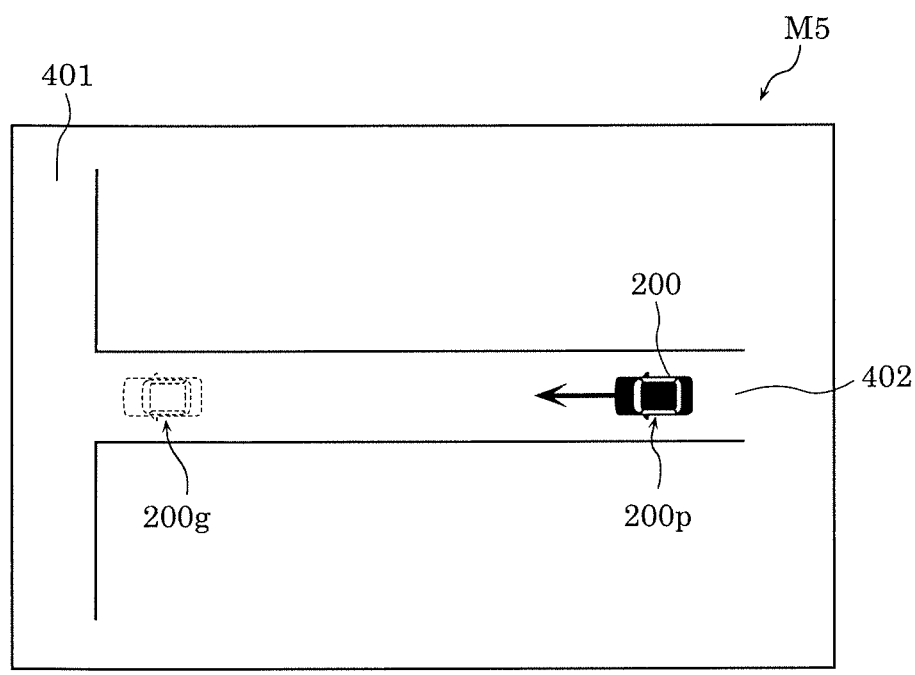
FIG. 12C illustrates yet another example of a display of a stop position of the operated vehicle according to Embodiment 3.

Upon obtaining the stop position of operated vehicle 200 from remote operation apparatus 140, display apparatus 110 displays an image including the stop position (S460). One example of the stop position displayed by display apparatus 110 will be given with reference to FIG. 12A through FIG. 12C. Note that FIG. 12A through FIG. 12C illustrate stop positions of operated vehicle 200 in cases in which packet loss occurs. FIG. 12A illustrates an example of a display of the stop positions of operated vehicle 200 according to the present embodiment. Image M3 illustrated in FIG. 12A shows stop range 201 of potential stop positions of operated vehicle 200 resulting from packet loss. Stop range 201 is one example of the first stop range.

As illustrated in FIG. 12A, controller 141 may display a range of stop positions of operated vehicle 200 on display apparatus 110. Controller 141 may display stop range 201 of operated vehicle 200, from stop position 200d corresponding to a transmission count of 1 (one example of the second stop position) to stop position 200e corresponding to a transmission count of N (one example of the first stop position). Stated differently, controller 141 may output image information including stop range 201 based on stop positions 200d and 200e to display apparatus 110.

This makes it possible for operator H to know the range of potential stop positions of operated vehicle 200 when operated vehicle 200 is caused to perform an emergency stop, in situations in which packet loss occurs. In other words, operator H can check the range in which there is a possibility of operated vehicle 200 stopping after performing an emergency stop to determine whether operated vehicle 200 can be caused to safely perform an emergency stop. For example, since stop range 201 illustrated in FIG. 12A extends through an intersection, operator H can determine that it would be dangerous to perform an emergency stop.

For example, controller 141 may display image M3 illustrated in FIG. 12A on display apparatus 110 when, based on map information for the surrounding area of current position 200p of operated vehicle 200 or an image captured by imaging device 220 in operated vehicle 200, there is a range in which there is a risk of operated vehicle 200 colliding with an obstacle in the direction of travel of operated vehicle 200, such as an intersection. Note that a range in which there is a risk of collision in the direction of travel means a region of within a first distance from current position 200p. The first distance is determined based on, for example, the speed of operated vehicle 200, and is, for example, a few meters or a tens of meters.

Note that FIG. 12A illustrates an example in which stop range 201 is shown as a rectangle, but stop range 201 may be shown as an ellipse or some other shape so long as it encompasses stop positions 200d and 200e. Moreover, stop range 201 may be displayed as flashing. Moreover, stop range 201 is exemplified as a solid outline, but stop range 201 may be displayed as being filled in with a predetermined color (for example, red).

Next, another example of the stop position displayed by display apparatus 110 will be given with reference to FIG. 12B. FIG. 12B illustrates another example of a display of the stop position of operated vehicle 200 according to the present embodiment. Image M4 illustrated in FIG. 12B shows stop position 200f, which is the stop position closest to current position 200p of operated vehicle 200.

As illustrated in FIG. 12B, controller 141 may display, on display apparatus 110, stop position 200f closest to current position 200p from among the potential stop positions of operated vehicle 200 when packet loss occurs. Controller 141 may display image M4 including stop position 200f when operated vehicle 200 performs an emergency stop using the emergency stop control information transmitted for the first time (one example of the second stop position). Stated differently, controller 141 may output image information including stop position 200f to display apparatus 110.

For example, controller 141 may display image M4 illustrated in FIG. 12B on display apparatus 110 when, based on map information for the surrounding area of current position 200p of operated vehicle 200 or an image captured by imaging device 220 in operated vehicle 200, operated vehicle 200 is in an intersection or immediately before operated vehicle 200 enters an intersection. Immediately before entering an intersection means a current position 200p is within a second distance from the intersection. The second distance is, for example, few meters or a tens of meters.

Next, yet another example of the stop position displayed by display apparatus 110 will be given with reference to FIG. 12C. FIG. 12C illustrates yet another example of a display of the stop position of operated vehicle 200 according to the present embodiment. Image M5 illustrated in FIG. 12C shows stop position 200g, which is the stop position farthest from current position 200p of operated vehicle 200.

As illustrated in FIG. 12C, controller 141 may display, on display apparatus 110, stop position 200g farthest from current position 200p from among the potential stop positions of operated vehicle 200 when packet loss occurs. Controller 141 may display image M5 including stop position 200g at which operated vehicle 200 would stop if operated vehicle 200 were to perform an emergency stop using the emergency stop control information transmitted for the N-th time (one example of the first stop position). Stated differently, controller 141 may output image information including stop position 200g to display apparatus 110.

For example, controller 141 may display image M5 illustrated in FIG. 12C on display apparatus 110 when, based on map information for the surrounding area of current position 200p of operated vehicle 200 or an image captured by imaging device 220 in operated vehicle 200, there is no region in which there is a risk of operated vehicle 200 colliding with an obstacle in the direction of travel of operated vehicle 200, such as an intersection. Note that no region in which there is a risk of collision in the direction of travel means there is no such region within a third distance from current position 200p. Moreover, the third distance is, for example, tens of meters or hundreds of meters.

As described, above, the information processing method of remote operation apparatus 140 according to the present embodiment further includes calculating, based on the packet loss rate in the communication network, the number of times N (N≥2) to repeatedly transmit control information indicating to perform an emergency stop (i.e., transmission count N) (S430), and the stop position is calculated further using the transmission count N.

With this, by calculating the stop position using the transmission count N, which is based on packet loss rate, it is possible to calculate the stop position taking into account packet loss, even when packet loss occurs during communication between operated vehicle 200 and remote operation apparatus 140. For example, operator H can determine whether operated vehicle 200 can be stopped safely by knowing where the first stop position (for example, stop position 200g), which is the farthest position among the stop positions of operated vehicle 200 calculated taking into account packet loss rate, is. Accordingly, with the information processing method of remote operation apparatus 140 according to the present embodiment, it is possible to cause the operated vehicle to safely perform an emergency stop, even while packet loss is occurring.

Moreover, operator H can accurately determine whether operated vehicle 200 can safely stop, by knowing stop range 201 of potential stop positions of operated vehicle 200 due to packet loss. Stop range 201 includes stop position 200d and stop position 200e. With this, it is possible to more safely cause operated vehicle 200 to perform an emergency stop, even while packet loss is occurring.

Figure 13:
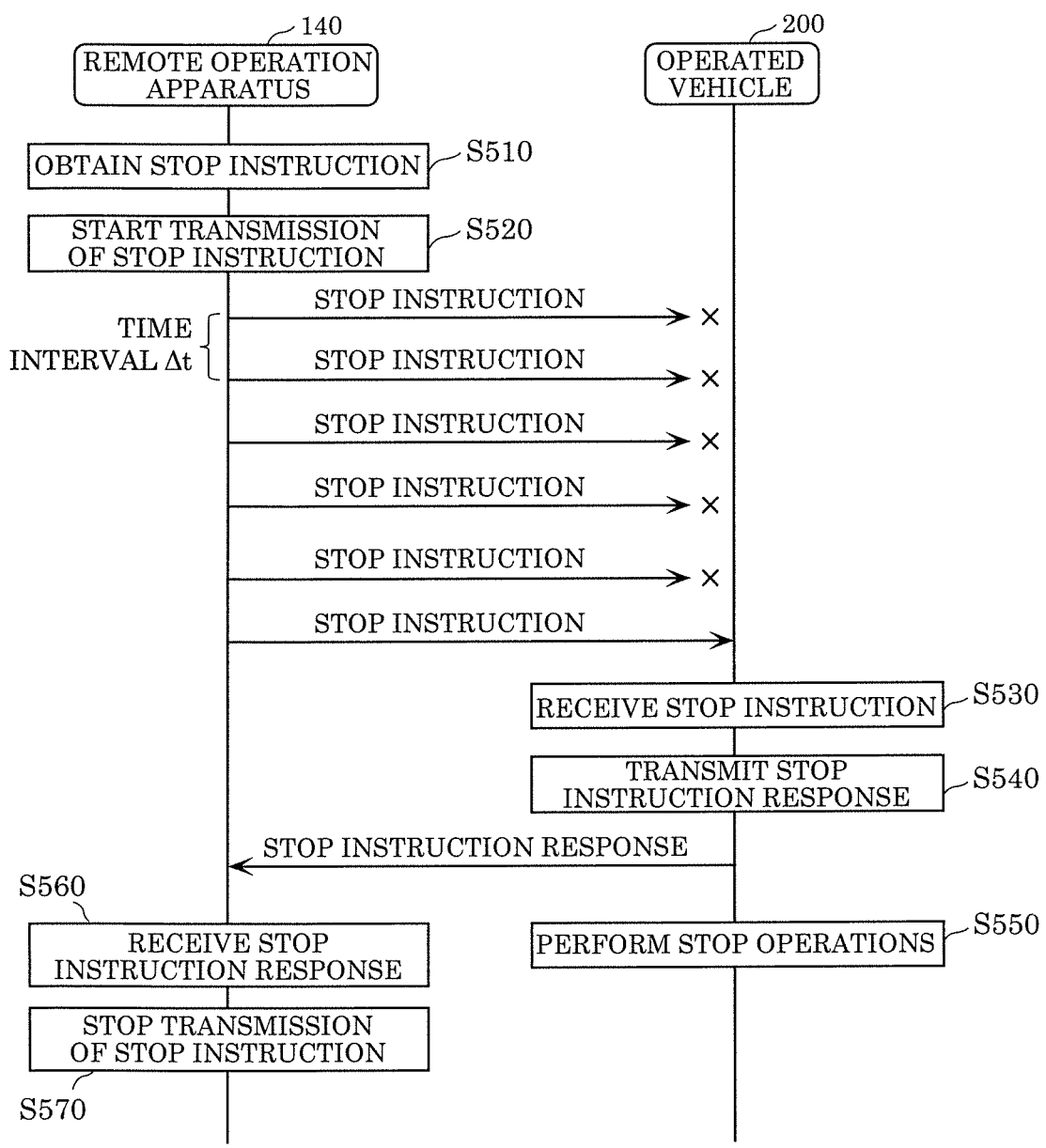
FIG. 13 is a sequence chart illustrating operations for transmitting and receiving a stop instruction between the remote operation apparatus and the operated vehicle according to Embodiment 3.

Here, operations performed by remote operation apparatus 140 to transmit emergency stop control information (called a "stop instruction" in FIG. 13) while packet loss is occurring will be described with reference to FIG. 13. FIG. 13 is a sequence chart illustrating operations for transmitting and receiving a stop instruction between remote operation apparatus 140 and operated vehicle 200 according to the present embodiment. Note that the operations illustrated in FIG. 13 are implemented regardless of the calculated transmission count N described above.

As illustrated in FIG. 13, first, remote operation apparatus 140 obtains a stop instruction for causing operated vehicle 200 to perform an emergency stop from operator H (S510). Specifically, controller 141 obtains a stop instruction by obtaining emergency stop information from emergency stop apparatus 130. Upon receiving the emergency stop information, controller 141 starts transmitting, to operated vehicle 200, a stop instruction including the emergency stopping of operated vehicle 200 (S520). Specifically, controller 141 transmits, to operated vehicle 200 via communicator 142, emergency stop control information that is based on emergency stop information.

When controller 141 does not receive a stop instruction response, which is a response to the first transmission of the stop instruction, from operated vehicle 200, controller 141 transmits the stop instruction a second time. Controller 141 repeatedly transmits the stop instruction at time intervals of Δt, until controller 141 obtains a stop instruction response from operated vehicle 200. FIG. 13 illustrates a case in which the stop instruction transmitted the first through fifth times by controller 141 does not reach operated vehicle 200, due to packet loss. Stated differently, controller 141 does not receive a stop instruction response in response to the first through fifth transmissions of the stop instruction.

Operated vehicle 200 receives the stop instruction transmitted by remote operation apparatus 140 (S530). FIG. 13 illustrates an example in which operated vehicle 200 receives the stop instruction on the sixth transmission by remote operation apparatus 140. Upon receiving the stop instruction from remote operation apparatus 140, operated vehicle 200 transmits a stop instruction response, which is a response corresponding to the stop instruction, to remote operation apparatus 140 (S540). Operated vehicle 200 then performs stop operations based on the stop instruction (S550). Upon receiving the stop instruction response from operated vehicle 200 (S560), remote operation apparatus 140 stops transmission of the stop instruction (S570).

As described above, remote operation apparatus 140 can cause operated vehicle 200 to perform an emergency stop, even when packet loss is occurring in the communication network, by repeatedly transmitting the stop instruction until a stop instruction response is received from operated vehicle 200.

Embodiment 4

Figure 14:
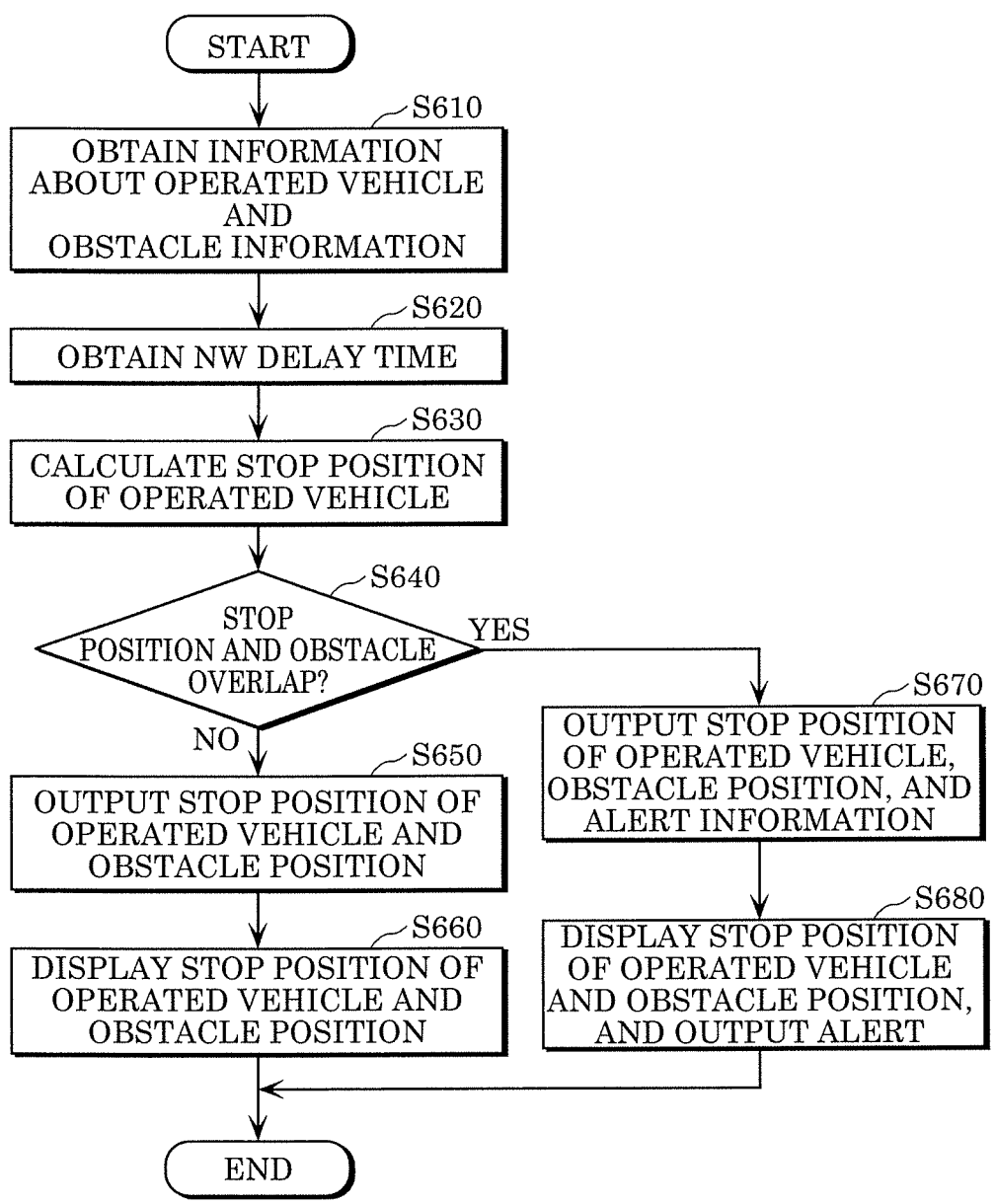
FIG. 14 is a flow chart illustrating operations performed by a remote operation system according to Embodiment 4.

Next, operations performed by remote operation system 100 will be described with reference to FIG. 14 through FIG. 15B. FIG. 14 is a flow chart illustrating operations performed by remote operation system 100 according to the present embodiment. Note that in this example, the configuration of the remote operation system according to the present embodiment is the same as remote operation system 100 according to Embodiment 1, but may be the same as remote operation system 100a according to Embodiment 2.

As illustrated in FIG. 14, remote operation apparatus 140 obtains vehicle information about operated vehicle 200, and obstacle information (obstacle position information) (S610). Specifically, controller 141 receives vehicle information about operated vehicle 200 from operated vehicle 200 via communicator 142. Moreover, controller 141 obtains, via communicator 142, obstacle information related to an obstacle present in the surrounding area of operated vehicle 200. For example, obstacle information is information including the current position of an obstacle present in the surrounding area of operated vehicle 200 and detected by at least one of sensor 210 and imaging device 220 included in operated vehicle 200. Moreover, the obstacle information may further include information related to at least one of the current position of the obstacle, the speed of the obstacle, the acceleration of the obstacle, the direction of travel of the obstacle, the size of the obstacle, and type of obstacle. The type of obstacle differentiates between, for example, a pedestrian, motorcycle, and automobile. The current position of the obstacle indicates the position of the obstacle at the point in time that the obstacle is sensed by the sensors. For example, the obstacle information is information related to an obstacle present in the direction of travel of operated vehicle 200. In the present embodiment, communicator 142 also functions as an obstacle information obtainer that obtains the obstacle information. The obstacle information may be stored in storage 143.

Note that in step S610, remote operation apparatus 140 is not limited to obtaining obstacle information from operated vehicle 200. For example, remote operation apparatus 140 may obtain obstacle information related to an obstacle present in the surrounding area of operated vehicle 200 from, for example, an imaging device or sensor on the road on which operated vehicle 200 is driving.

Since steps S620 and S630 in FIG. 4 are the same as steps S20 and S30 in FIG. 4, repeated description thereof is omitted.

Then, controller 141 determines whether the stop position of operated vehicle 200 calculated in step S630 and an obstacle based on the obstacle information obtained in step S610 overlap (S640). In other words, controller 141 determines whether there is a risk of collision between operated vehicle 200 and an obstacle. In this way, in the present embodiment, controller 141 also functions as a collision risk determiner that determines whether there is a risk of collision between operated vehicle 200 and an obstacle. For example, controller 141 determines whether the stop position of operated vehicle 200 and an obstacle overlap by using, for example, an intersection determining method.

The stop position is, for example, the position at which operated vehicle 200 would stop if operated vehicle 200 positioned in the current position were caused to perform an emergency stop by operator H (by, for example, operating emergency stop apparatus 130). Note that the stop position may be the position at which operated vehicle 200 would stop if operated vehicle 200 positioned in the current position were stopped normally by operator H (by, for example, operating the brake pedal of operation input apparatus 120).

Figure 15A:
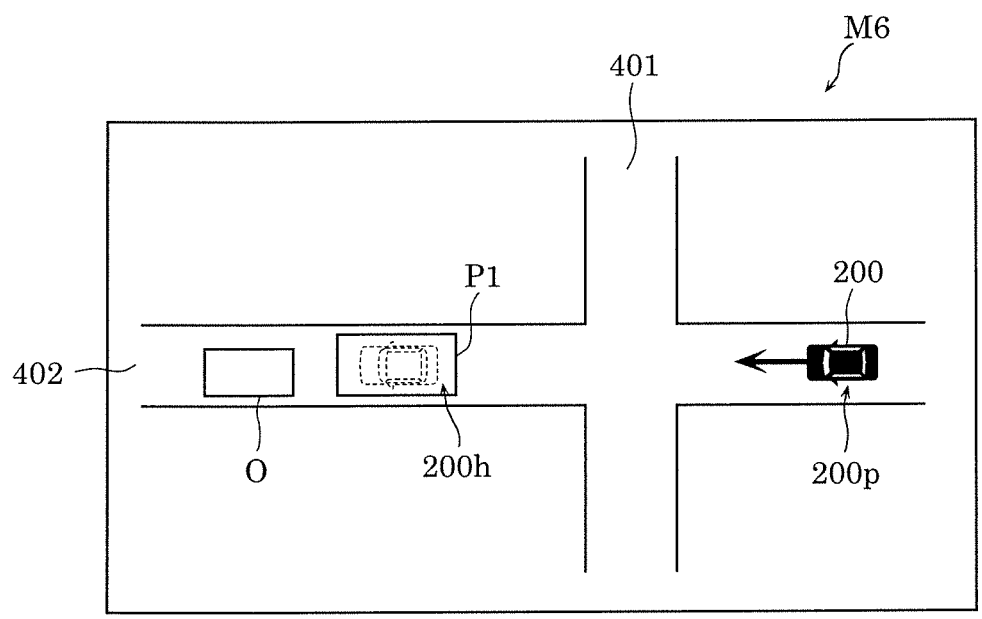
FIG. 15A illustrates an example of a display of a stop position of an operated vehicle according to Embodiment 4.

FIG. 15A illustrates an example of a display of stop position P1 of operated vehicle 200 according to the present embodiment. In FIG. 15A, stop position P1 of operated vehicle 200 and obstacle O do not overlap in image M6. In this case, controller 141 determines that stop position P1 of operated vehicle 200 and obstacle O do not overlap (no in S640), i.e., determines that operated vehicle 200 and obstacle O will not collide.

Note that controller 141 performs the above determination using a frame (for example, a rectangle frame) surrounding operated vehicle 200 at stop position 200h as stop position P1 of operated vehicle 200, but this example is not limiting. For example, controller 141 may determine whether there is a risk of collision between operated vehicle 200 and obstacle O based on whether stop position 200h and obstacle O overlap. Moreover, in a plan view, the frame indicating stop position P1 includes operated vehicle 200 and is larger than operated vehicle 200. For example, the size of the frame relative to operated vehicle 200 is set in advance. By setting the frame indicating stop position P1 to be large, operated vehicle 200 can be driven more safely. Note that stop position P1 is one example of the third stop position.

Controller 141 then outputs stop position P1 of operated vehicle 200 and the obstacle position to display apparatus 110 (S650). For example, controller 141 outputs stop position information indicating stop position P1 of operated vehicle 200 and obstacle information including the position of obstacle O (obstacle position information). For example, controller 141 outputs, to display apparatus 110, image information including stop position P1 of operated vehicle 200 and the obstacle position or image information for displaying an aerial view including stop position P1 of operated vehicle 200 and the obstacle position. For example, controller 141 prohibits the output of alert information when the result of step S640 is "no".

Upon obtaining stop position P1 of operated vehicle 200 and the obstacle position from remote operation apparatus 140, display apparatus 110 displays an image including stop position P1 and the obstacle position (image M6 illustrated in FIG. 15A) (S660).

As FIG. 15A shows, operated vehicle 200 can come to a stop safely without colliding with obstacle O when operated vehicle 200 performs an emergency stop at current position 200p. By checking image M6, operator H can easily recognize that performing an emergency stop at current position 200p enables operated vehicle 200 to perform a safe emergency stop.

Moreover, since operator H can confirm that obstacle O is on the road on which operated vehicle 200 is driving, operator H can pay close attention to whether to perform a driving maneuver for avoiding a collision between operated vehicle 200 and obstacle O. Then, when operator H does not perform a driving maneuver for avoiding a collision between operated vehicle 200 and obstacle O, operator H can monitor image M6 and appropriately time when to cause operated vehicle 200 to perform an emergency stop.

Figure 15B:
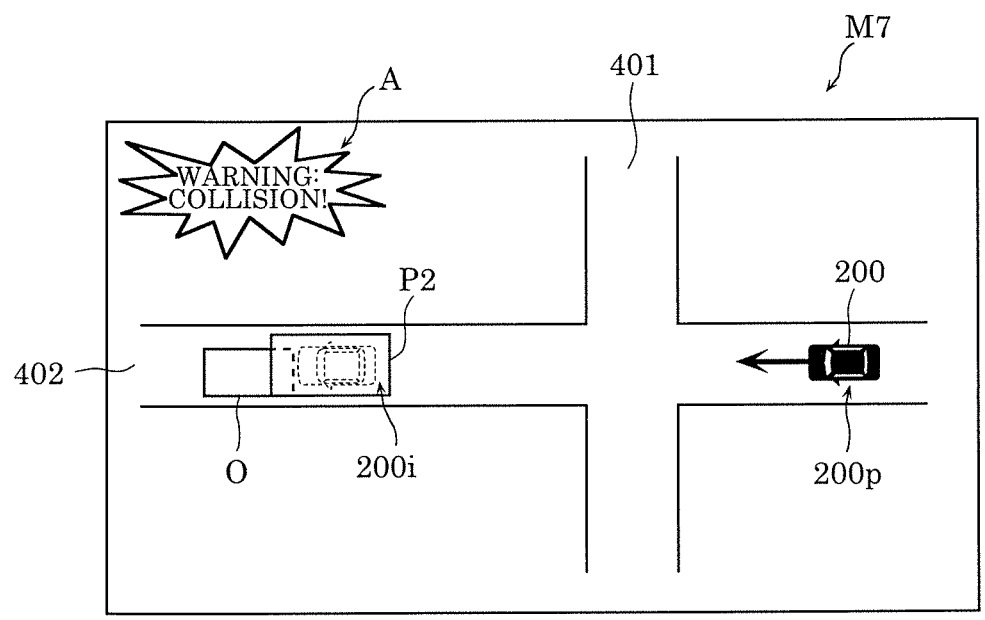
FIG. 15B illustrates another example of a display of a stop position of the operated vehicle according to Embodiment 4.

FIG. 15B illustrates an example of a display of stop position P2 of operated vehicle 200 according to the present embodiment. In FIG. 15B, stop position P2 of operated vehicle 200 and obstacle O overlap in image M7. In this case, controller 141 determines that stop position P2 of operated vehicle 200 and obstacle O do overlap (yes in S640), i.e., determines that there is a risk of collision between operated vehicle 200 and obstacle O. Moreover, controller 141 may further determine that there is a risk of collision between operated vehicle 200 and obstacle O when, in image M7, the distance between stop position P2 and obstacle O is less than or equal to a predetermined distance. Note that stop position P2 is a frame (for example, a rectangle frame) surrounding operated vehicle 200 positioned at stop position 200i.

Controller 141 then outputs stop position P2 of operated vehicle 200, the obstacle position, and alert information to display apparatus 110 (S670). For example, controller 141 outputs stop position information indicating stop position P2 of operated vehicle 200, obstacle information indicating the current position of obstacle O (obstacle position information), and alert information for informing operator H that there is a risk of a collision between operated vehicle 200 and obstacle O. For example, controller 141 outputs, to display apparatus 110, image information including: stop position P2 of operated vehicle 200; the obstacle position; and alert A based on alert information, or image information for displaying an aerial view including stop position P2 of operated vehicle 200, the obstacle position, and alert A based on alert information.

Upon obtaining, from remote operation apparatus 140, stop position P2 of operated vehicle 200, the obstacle position, and the alert information, display apparatus 110 outputs the obtained stop position P2, obstacle position, and alert (S680). In the present embodiment, display apparatus 110 outputs the alert by displaying an image (for example, image M7 illustrated in FIG. 15B) including alert A.

As illustrated in FIG. 15B, in image M7, alert A is exemplified as the text "WARNING: COLLISION!". With this, operator H can recognize that there is a risk of a collision between operated vehicle 200 and obstacle O just by looking at alert A displayed in image M7. For example, when there is concern that operated vehicle 200 will collide with obstacle O if operated vehicle 200 continues driving via automated driving, or when operated vehicle 200 does not attempt to stop even though obstacle O is present in the direction of travel of operated vehicle 200, operator H can cause operated vehicle 200 to perform an emergency stop based on image M7 illustrated in FIG. 15B.

Moreover, as described above, since remote operation apparatus 140 displays alert A on display apparatus 110, operator H can easily notice that there is a risk of a collision involving operated vehicle 200. Alert A should be displayed in image M7 in the vicinity of the position at which there is concern of a collision between operated vehicle 200 and obstacle O, and in a position that does not overlap road 402.

Note that alert information is not limited to information indicating the display of text that warns operator H on image M7; alert information may be information indicating a change of the display state of image M7. The alert information may be information indicating a change of at least one of the size, color, and shape of the frame of stop position P2 of operated vehicle 200 from the state when there is no risk of a collision involving operated vehicle 200, and may be information indicating causing image M7 to flash.

Moreover, alert information is not limited to a changing of the display state. For example, alert information may be information indicating to operator H that there is a risk of a collision involving operated vehicle 200 via sound (for example, a warning sound). The sound may be output from display apparatus 110 when display apparatus 110 includes a speaker, and may be output by an apparatus other than display apparatus 110. Moreover, the alert information may be information including providing a stimulus to the user by, for example, vibration (for example, vibrating the desk or chair). Moreover, the alert information may be any combination of the above.

As illustrated in FIG. 15B, when an emergency stop is performed at current position 200p, there is a possibility operated vehicle 200 will collide with obstacle O, as is indicated by the position of obstacle O and stop position P2. Operator H can recognize whether there is a need to cause operated vehicle 200 to perform an emergency stop, by checking image M7.

Note that although FIG. 15A and FIG. 15B illustrate examples in which current position 200p of operated vehicle 200 and the stop position (for example, stop positions P1 and P2), as well as the position of obstacle O are shown in the image, it is sufficient if at least the stop position and the position of obstacle O are shown.

As described above, the information processing method implemented in remote operation apparatus 140 according to the present embodiment includes: obtaining vehicle information about operated vehicle 200 (S610); obtaining the delay time of the communication network (S620); calculating, based on the vehicle information and the delay time, stop position P1 or P2 that operated vehicle 200 would stop at if operated vehicle 200 were caused to perform an emergency stop (S630), and outputting stop position information indicating the calculated stop position P1 or P2 (S650, S670). The information processing method further includes: obtaining obstacle information including the position of obstacle O in the surrounding area of operated vehicle 200 (S610); and determining, based on stop position P1 or P2 and obstacle O, whether there is a risk of collision between operated vehicle 200 and obstacle O (S640).

Then, in the determining, when controller 141 determines that there is a risk of a collision between operated vehicle 200 at stop position P2 and obstacle O (yes in S640), controller 141 outputs, in the outputting, obstacle information including the position of obstacle O and alert information, in addition to the stop position information indicating stop position P2 (S670). Moreover, in the determining, when controller 141 determines that there is not a risk of a collision between operated vehicle 200 at stop position P1 and obstacle O (no in S640), controller 141 outputs, in the outputting, obstacle information including the position of obstacle O, in addition to the stop position information indicating stop position P1 (S650).

This makes it possible to, when there is a risk of collision between operated vehicle 200 and obstacle O, inform operator H of the risk of collision via alert A before operated vehicle 200 collides with obstacle O. In other words, operator H can cause operated vehicle 200 to stop (for example, come to an emergency stop) before operated vehicle 200 collides with obstacle O. Moreover, even in cases in which operated vehicle 200 and obstacle O will collide, since emergency stop operations can be performed ahead of time before the collision, the severity of the collision can be mitigated.

Embodiment 5

Figure 16:
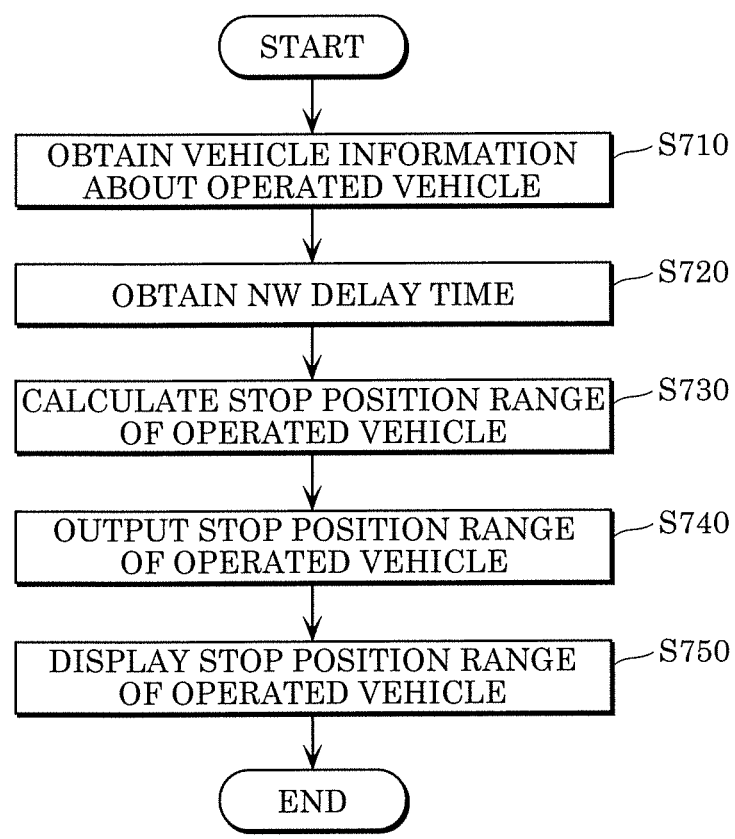
FIG. 16 is a flow chart illustrating operations performed by a remote operation system according to Embodiment 5.

Next, operations performed by remote operation system 100 will be described with reference to FIG. 16 through FIG. 17C. FIG. 16 is a flow chart illustrating operations performed by remote operation system 100 according to the present embodiment. Note that in this example, the configuration of the remote operation system according to the present embodiment is the same as remote operation system 100 according to Embodiment 1, but may be the same as remote operation system 100a according to Embodiment 2. Since steps S710 and S720 in FIG. 4 are the same as steps S10 and S20 in FIG. 4 (or steps S310 and S320 in FIG. 8), repeated description thereof is omitted.

As illustrated in FIG. 16, controller 141 calculates the stop position range of operated vehicle 200 (S730). Controller 141 calculates the stop position range based on changes in the vehicle information (for example, speed, steering, etc.) about operated vehicle 200. The stop position range is the range of positions at which operated vehicle 200 will stop or is highly likely to stop based on changes in the vehicle information (for example, the speed or steering of operated vehicle 200). For example, when the vehicle information indicates speed, controller 141 calculates stop positions for each of maximum and minimum speed values, and takes the range including the two calculated stop positions as the stop position range. For example, the stop position range is the region between by two stop positions, including the stop positions themselves.

For example, the minimum speed value v_min, where v is the current speed, is calculated with the following Equation 3.

[MATH. 3]

$$v\_min = v - v\_threshold \quad \text{(Equation 3)}$$

Moreover, for example, the maximum speed value v_max, where v is the current speed, is calculated with the following Equation 4.

[MATH. 4]

$$v\_max = v + v\_threshold \quad \text{(Equation 4)}$$

Note that v_threshold indicates the amount of change in speed, and may be a constant value, and may be calculated based on, for example, acceleration or time. When the amount of change in speed v_threshold is a constant value, the amount of change in speed v_threshold is, for example, in the range of from 10 km/s to 20 km/s. Note that information for calculating minimum speed value v_min and maximum speed value v_max (for example, Equation 3, Equation 4, amount of change v_threshold, etc.) is stored in storage 143.

Then, based on the minimum speed value v_min and the maximum speed value v_max calculated using Equations 3 and 4, controller 141 calculates the minimum stop distance and maximum stop distance for operated vehicle 200. The minimum stop distance is the minimum distance among distances from current position 200p of operated vehicle 200 to the stop positions. The minimum stop distance may be a distance estimated be the shortest. The maximum stop distance is the maximum distance among distances from current position 200p of operated vehicle 200 to the stop positions. The maximum stop distance may be a distance estimated be the longest.

For example, the minimum stop distance, i.e., the minimum value among stop distances, is calculated with the following Equation 5, where p is the current position of operated vehicle 200, v_min is the minimum speed value of operated vehicle 200, a is the deceleration of operated vehicle 200, t_nw is the communication network delay time, and t_sys is the system delay time.

[MATH. 5]

$$\text{minimum stop distance} = p + v\_min \times (t\_nw + t\_sys) + \int_0^{v/a} (v\_min - a \times t)\, dt \quad \text{(Equation 5)}$$

The second item indicates the minimum distance of travel of operated vehicle 200 from the time of operation of emergency stop apparatus 130 by operator H to the time operated vehicle 200 actually starts emergency stop operations (hereinafter also referred to as stop operations) (i.e., minimum brake reaction distance value). The third item indicates the minimum distance of travel of operated vehicle 200 from the time that operated vehicle 200 performs the stop operations to the time that operated vehicle 200 actually comes to a stop (i.e., minimum braking distance value). Deceleration a is the deceleration when operated vehicle 200 is caused to perform an emergency stop, and is for example in the range of 0.1 G to 0.3 G (where G indicates acceleration due to gravity; G-forces). For example, as the stop operations, operated vehicle 200 decelerates at a constant deceleration a.

Moreover, for example, the maximum stop distance, i.e., the maximum value among stop distances, is calculated with the following Equation 6, where p is the current position of operated vehicle 200, v_max is the maximum speed value of operated vehicle 200, a is the deceleration of operated vehicle 200, t_nw is the communication network delay time, and t_sys is the system delay time.

[MATH. 6]

$$\text{maximum stop distance} = p + v\_\text{max} \times (t\_nw + t\_sys) + \int_0^{v/a} (v\_\text{max} - a \times t) dt \quad \text{(Equation 6)}$$

The second item indicates the maximum distance of travel of operated vehicle 200 from the time of operation of emergency stop apparatus 130 by operator H to the time operated vehicle 200 actually starts stop operations (i.e., maximum brake reaction distance value). The third item indicates the maximum distance of travel of operated vehicle 200 from the time that operated vehicle 200 performs the stop operations to the time that operated vehicle 200 actually comes to a stop (i.e., maximum braking distance value).

Controller 141 then calculates the stop position range of operated vehicle 200 using the two stop positions. For example, assume the stop position calculated based on Equation 5 is stop position P3 illustrated in FIG. 17A. Stop position P3 is a frame (for example, a rectangle frame) surrounding operated vehicle 200 positioned at stop position 200j. Moreover, for example, assume the stop position calculated based on Equation 6 is stop position P4 illustrated in FIG. 17B. Stop position P4 is a frame (for example, a rectangle frame) surrounding operated vehicle 200 positioned at stop position 200k.

Figure 17A:
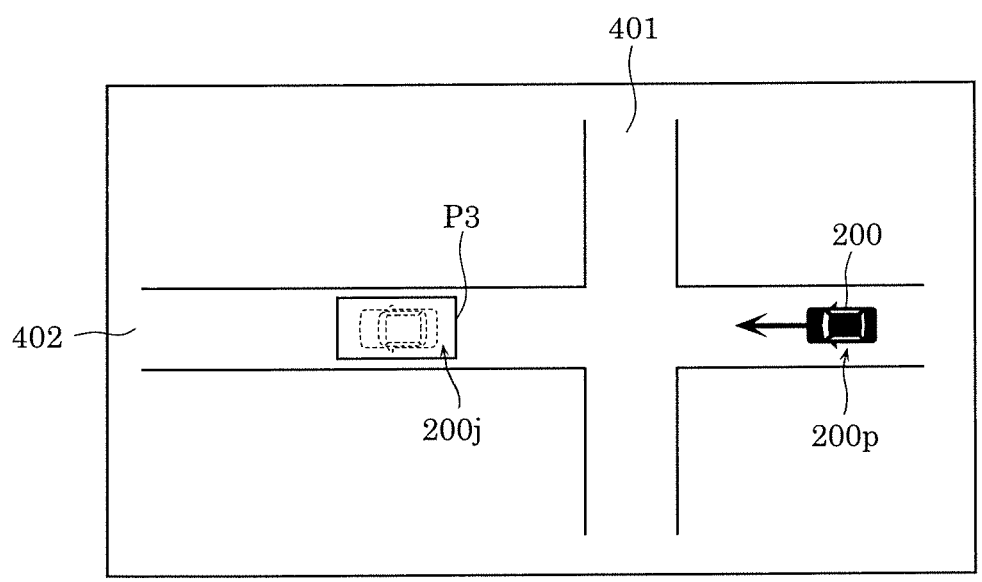
FIG. 17A illustrates a stop position that corresponds to a short stop distance of an operated vehicle according to Embodiment 5.
Figure 17B:
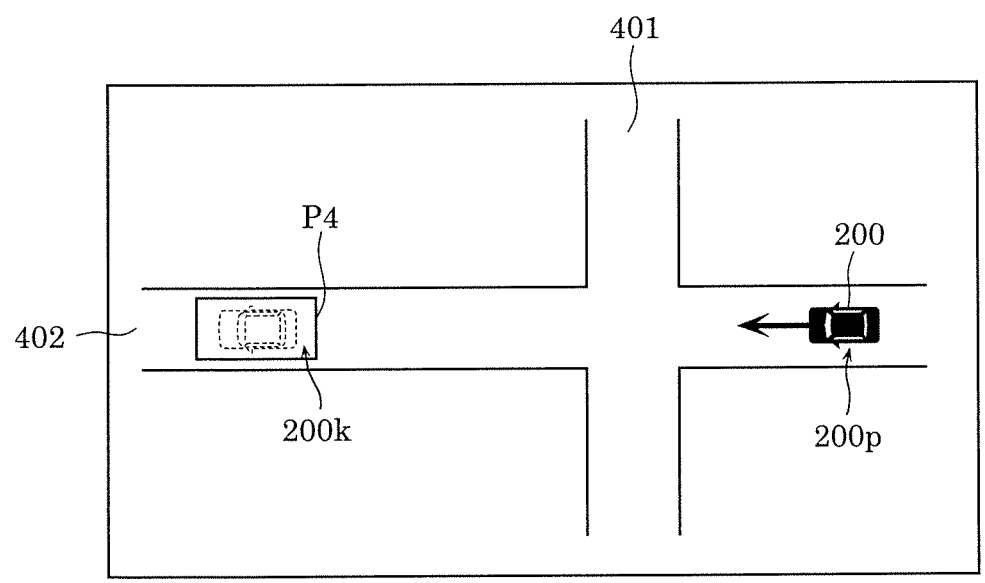
FIG. 17B illustrates a stop position that corresponds to a long stop distance of the operated vehicle according to Embodiment 5.

The distance between stop position P4 and current position 200p of operated vehicle 200 is greater than the distance between stop position P3 and current position 200p of operated vehicle 200. Note that FIG. 17A illustrates stop position P3, which corresponds to the short stop distance of operated vehicle 200 according to the present embodiment. FIG. 17B illustrates stop position P4, which corresponds to the long stop distance of operated vehicle 200 according to the present embodiment. Moreover, stop position P3 is one example of the third stop position, and stop position P4 is one example of the fourth stop position.

Figure 17C:
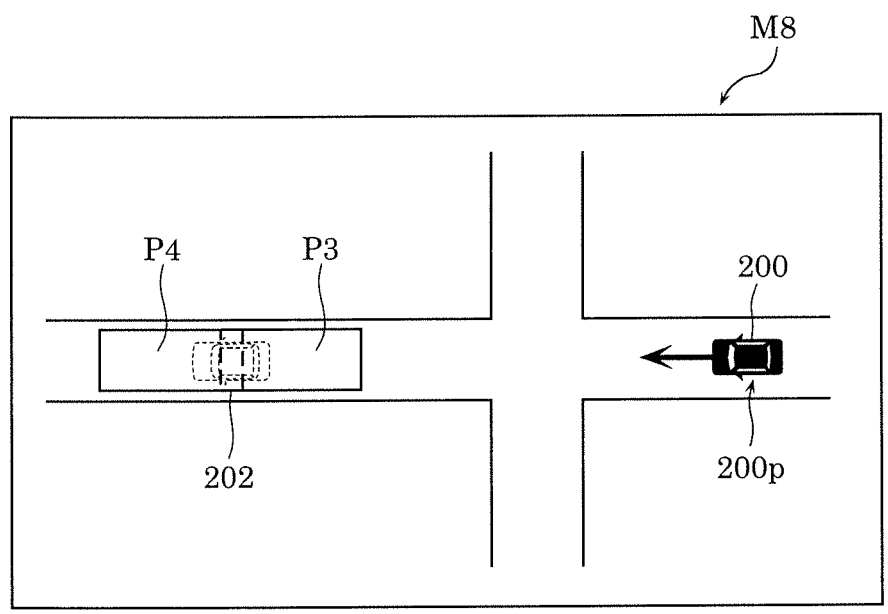
FIG. 17C illustrates an example of a display of stop range of the operated vehicle according to Embodiment 5.

As illustrated in FIG. 17C, controller 141 determines the stop position range (stop range 202) to be a range including stop position P3 and stop position P4. For example, stop range 202 includes stop position P3 and stop position P4, and the region between stop position P3 and stop position P4. With this, even when vehicle information about operated vehicle 200 is changing, it is possible to calculate stop range 202 of potential stop positions of operated vehicle 200. Note that FIG. 17C illustrates an example of a display of stop range 202 of operated vehicle 200 according to the present embodiment. Moreover, stop range 202 is one example of the second stop range.

Note that in the above description, stop range 202 is exemplified as being calculated from the maximum stop distance and minimum stop distance, but this example is not limiting. Stop range 202 may be calculated using a far stop position and a near stop position, compared to a stop position calculated without taking into consideration the amount of change in speed v_threshold. For example, stop range 202 may be calculated using stop positions calculated using faster and slower speeds than current speed v of operated vehicle 200. Stop range 202 may be calculated using a stop position calculated without taking into consideration the amount of change in speed v_threshold, and one of a stop position farther than said stop position and a stop position closer than said stop position. For example, stop range 202 may be calculated using a stop position calculated using current speed v of operated vehicle 200, and one of a speed that is faster than the current speed and a speed that is slower than the current speed.

Controller 141 then outputs the stop position range (stop range 202) including stop position P3 and stop position P4 of operated vehicle 200 to display apparatus 110 (S740). Specifically, controller 141 outputs stop position information including stop range 202 of operated vehicle 200. For example, controller 141 outputs, to display apparatus 110, image information including stop range 202 of operated vehicle 200 or image information for displaying an aerial view including stop range 202 of operated vehicle 200.

Upon obtaining stop range 202 of operated vehicle 200 from remote operation apparatus 140, display apparatus 110 displays an image including stop range 202 (for example, image M8 illustrated in FIG. 17C) (S750).

As described above, the information processing method implemented in remote operation apparatus 140 according to the present embodiment includes: obtaining vehicle information about operated vehicle 200 (S710); obtaining the delay time of the communication network (S720); calculating, based on the vehicle information and the delay time, stop range 202 that operated vehicle 200 would stop in if operated vehicle 200 were caused to perform an emergency stop (S730), and outputting the calculated stop range 202 (S770).

The stop positions for calculating stop range 202 include a third stop position and a fourth stop position that are calculated based on the vehicle information, the fourth stop position being farther than the third stop position. The third stop position is, for example, stop position P3 calculated based on a first speed that is slower than current speed v of operated vehicle 200 included in the vehicle information. The fourth stop position is, for example, stop position P4 calculated based on a second speed that is faster than current speed v of operated vehicle 200 included in the vehicle information.

In the present embodiment, controller 141 calculates, in the calculating, stop range 202, based on stop position P3 calculated based on the minimum speed value v_min of operated vehicle 200 and stop position P4 calculated the maximum speed value v_max of operated vehicle 200. The minimum speed value v_min is one example of the first speed that is slower than current speed v, and the maximum speed value v_max is one example of the second speed that is faster than current speed v.

Then, in the outputting, controller 141 outputs stop position information including stop position P3 and stop position P4 to display apparatus 110.

This makes it possible for operator H to operate operated vehicle 200 based on stop range 202 in image M8 illustrated in FIG. 17C. Since operator H can operate operated vehicle 200 taking into consideration potential stop positions of operated vehicle 200, operator H can more appropriately operate operated vehicle 200.

Other Embodiments

Hereinbefore, the present disclosure has been described based on Embodiments 1 through 5 (hereinafter also referred to as "the above embodiments"), but the present disclosure is not limited to the above embodiments.

For example, in the above embodiments, the controller in the remote operation apparatus is exemplified as displaying, on the display device, an image including the current position of the operated vehicle, but this example is not limiting. The controller in the remote operation apparatus may display, on the display apparatus, the position at which the operated vehicle initiates stop operations, rather than the current position of the operated vehicle. In such cases, for example, a stop operations initiation position may be used to calculate the stop position instead of current position $200p$ in Equations 1 and 2. Moreover, in such cases, the delay time may be a one-way delay time.

Moreover, in the above embodiments, an example is given where, when there is a possibility that the operated vehicle cannot drive safely, the remote operation apparatus displays, on the display apparatus, a stop position that the operated vehicle would stop at if caused to perform an emergency stop, but this example is not limiting. The remote operation apparatus may regularly display, on the display apparatus, the stop position that operated vehicle 200 would stop at if caused to perform an emergency stop.

Moreover, in the above embodiments, the communication method used between apparatuses included in the remote operation system is not particularly limited. The communication between the apparatuses may be wireless or wired communication. The communication between the apparatuses may be a combination of wireless and wired communication.

Moreover, in the above embodiments, the operated vehicle is exemplified as transmitting obstacle position information to the remote operation apparatus, but the obstacle position information need not be transmitted.

The various processing elements (for example, the controller) in the remote operation apparatus and the operated vehicle according to the above embodiments may typically be implemented as an LSI circuit, which is a type of integrated circuit. Each of these processing elements may be individually realized as a single chip, or a portion or all of the processing units may be realized as a single chip.

Moreover, circuit integration is not limited to LSI; the processing units may be realized as dedicated circuits or generic processors. A Field Programmable Gate Array (FPGA) which is programmable after manufacture of the LSI circuit or a reconfigurable processor which allows reconfiguration of the connections and settings of circuit cells inside the LSI circuit may be used.

Note that in the above embodiments, each element may be configured as specialized hardware, or each element may be realized by executing a software program suitable for the element. Each element may be realized by a program executing unit, such as a CPU or a processor, reading and executing the software program recorded on a storage medium such as a hard disk or semiconductor memory.

Moreover, the values used above are mere examples presented for specifically describing the present disclosure; the above embodiments of the present disclosure are not limited to the exemplary values.

Moreover, the block diagrams illustrate one example of the division of functional blocks; a plurality of functional blocks may be realized as a single functional block, a single functional block may be broken up into a plurality of functional blocks, and part of one function may be transferred to another functional block. The functions of a plurality of function blocks having similar functions may be processed by a single piece of hardware or software in parallel or by time-division.

Moreover, the orders in which the steps in the flowcharts are executed are mere examples presented for specifically describing the present disclosure; the orders in which the steps are executed may differ from those presented above. Moreover, some of the steps may be executed at the same time as (in parallel with) other steps.

Those skilled in the art will readily appreciate that many modifications to the elements and functions are possible in the above embodiments without materially departing from the spirit of the present disclosure. Accordingly, all such modifications are intended to be included within the scope of the present disclosure.

INDUSTRIAL APPLICABILITY

The information processing method, etc., according to one aspect of the present disclosure is useful in a remote operation apparatus for an operator in a remote location to remotely operate a vehicle over a communication network.

What is claimed is:

1. An information processing method of an information processing apparatus for remotely operating a vehicle via a communication network, the information processing method comprising:
   obtaining vehicle information about the vehicle;
   obtaining a delay time of the communication network;
   calculating, based on the vehicle information and the delay time, a stop position at which the vehicle would stop if the vehicle were caused to perform an emergency stop; and
   outputting stop position information indicating the stop position calculated,
   wherein the vehicle is set with a plurality of deceleration patterns for the emergency stop of the vehicle,
   the stop position is calculated for each of the plurality of deceleration patterns,
   in the outputting, the stop position information indicating the stop positions of the plurality of deceleration patterns is displayed to a remote operator of the vehicle, and
   the information processing method further comprises receiving, from the remote operator, a selection of a deceleration pattern for the emergency stop of the vehicle from among the plurality of deceleration patterns.

2. The information processing method according to claim 1, further comprising:
   calculating, based on a packet loss rate in the communication network, a number of times N to repeatedly transmit control information indicating to perform the emergency stop, where $N \geq 2$,
   wherein the stop position is calculated further using the number of times N.

3. The information processing method according to claim 2,
   wherein the stop position includes a first stop position at which the vehicle would stop if the vehicle were to perform the emergency stop based on the control information transmitted an N-th time.

4. The information processing method according to claim 3,
wherein the stop position further includes a second stop position at which the vehicle would stop if the vehicle were to perform the emergency stop based on the control information transmitted a first time, and
the stop position information includes a first stop range based on the first stop position and the second stop position.

5. The information processing method according to claim 1, further comprising:
obtaining obstacle information including a position of an obstacle in a surrounding area of the vehicle; and
determining, based on the stop position and the position of the obstacle, whether there is a risk of collision between the vehicle and the obstacle,
wherein in the outputting, alert information is further outputted when it is determined that there is a risk of collision between the vehicle and the obstacle in the determining, the alert information being for informing that there is a risk of collision between the vehicle and the obstacle.

6. The information processing method according to claim 1,
wherein the stop position includes a third stop position and a fourth stop position that are calculated based on the vehicle information, the fourth stop position being farther than the third stop position, and
the stop position information includes a second stop range based on the third stop position and the fourth stop position.

7. The information processing method according to claim 6,
wherein the third stop position is calculated based on a first speed that is slower than a speed of the vehicle included in the vehicle information, and
the fourth stop position is calculated based on a second speed that is faster than the speed of the vehicle.

8. The information processing method according to claim 1,
wherein the vehicle information includes information indicating a current position and a speed of the vehicle.

9. The information processing method according to claim 8,
wherein the vehicle information further includes at least one of an acceleration, a steering angle, an angular speed, and an angular acceleration of the vehicle.

10. An information processing apparatus for remotely operating a vehicle via a communication network, the information processing apparatus comprising:
a vehicle information obtainer that obtains vehicle information about the vehicle;
a delay time obtainer that obtains a delay time of the communication network;
a controller that calculates, based on the vehicle information and the delay time, a stop position at which the vehicle would stop if the vehicle were caused to perform an emergency stop; and
an outputter that outputs stop position information indicating the stop position calculated,
wherein the vehicle is set with a plurality of deceleration patterns for the emergency stop of the vehicle,
the stop position is calculated for each of the plurality of deceleration patterns, and
the outputter displays, to a remote operator of the vehicle, the stop position information indicating the stop positions of the plurality of deceleration patterns, and
the information processing apparatus further comprises a receiver that receives, from the remote operator, a selection of a deceleration pattern for the emergency stop of the vehicle from among the plurality of deceleration patterns.

11. An information processing system, comprising:
the information processing apparatus according to claim 10; and
a display apparatus that displays an image based on the stop position information outputted by the information processing apparatus.

12. An information processing method of an information processing apparatus for remotely operating a vehicle via a communication network, the information processing method comprising:
obtaining vehicle information about the vehicle;
obtaining a delay time of the communication network;
calculating, based on the vehicle information and the delay time, a stop position at which the vehicle would stop if the vehicle were caused to perform an emergency stop;
outputting stop position information indicating the stop position calculated;
obtaining obstacle information including a position of an obstacle in a surrounding area of the vehicle; and
determining, based on the stop position and the position of the obstacle, whether there is a risk of collision between the vehicle and the obstacle,
wherein in the outputting, alert information is further outputted when it is determined that there is a risk of collision between the vehicle and the obstacle in the determining, the alert information being for informing a remote operator of the vehicle that there is a risk of collision between the vehicle and the obstacle, and
at a time at which the alert information is output, the vehicle is driving via automated driving and the remote operator is not remotely operating the vehicle.

\* \* \* \* \*